United States Patent [19]
Carey, II et al.

[11] Patent Number: 6,080,497
[45] Date of Patent: *Jun. 27, 2000

[54] CORROSION-RESISTANT COATED COPPER METAL AND METHOD FOR MAKING THE SAME

[75] Inventors: Jay F. Carey, II, Follansbee, W. Va.; Mehrooz Zamanzadeh, Pittsburgh, Pa.; Nicholas R. Hesske, Weirton, W. Va.

[73] Assignee: The Louis Berkman Company, Steubenville, Ohio

[*] Notice: This patent is subject to a terminal disclaimer.

[21] Appl. No.: 09/071,316

[22] Filed: May 1, 1998

Related U.S. Application Data

[63] Continuation-in-part of application No. 08/929,623, Sep. 15, 1997, and application No. 08/980,985, Oct. 20, 1997, which is a continuation of application No. 08/636,179, Apr. 22, 1996, abandoned, which is a continuation-in-part of application No. 08/551,456, Nov. 1, 1995, Pat. No. 5,616,424, which is a continuation of application No. 08/402,925, Mar. 13, 1995, Pat. No. 5,491,036, which is a continuation-in-part of application No. 08/380,372, Jan. 30, 1995, Pat. No. 5,480,731, which is a continuation of application No. 08/153,026, Nov. 17, 1993, Pat. No. 5,395,703, which is a continuation of application No. 07/858,662, Mar. 27, 1992, Pat. No. 5,314,758, said application No. 08/929,623, is a continuation-in-part of application No. 08/604,074, Feb. 20, 1996, Pat. No. 5,667,849, and application No. 08/604,078, Feb. 20, 1996, Pat. No. 5,695,822, which is a continuation of application No. 08/438,042, May 8, 1995, Pat. No. 5,597,656, which is a continuation-in-part of application No. 08/338,386, Nov. 14, 1994, Pat. No. 5,470,667, which is a continuation of application No. 08/175,523, Dec. 30, 1993, Pat. No. 5,401,586, which is a continuation-in-part of application No. 08/154,376, Nov. 17, 1993, abandoned, which is a continuation of application No. 08/042,649, Apr. 5, 1993, abandoned, said application No. 08/604,074, is a continuation of application No. 08/551,456, said application No. 08/402,925, is a continuation-in-part of application No. 08/175,523, application No. 08/165,085, Dec. 10, 1993, Pat. No. 5,397,652, application No. 08/260,333, Jun. 15, 1994, Pat. No. 5,429,882, application No. 08/341,365, Nov. 17, 1994, Pat. No. 5,489,490, and application No. 08/347,261, Nov. 30, 1994, Pat. No. 5,491,035, which is a continuation-in-part of application No. 08/175,523, said application No. 08/165,085, is a continuation-in-part of application No. 08/001,101, Jan. 4, 1993, abandoned, which is a continuation-in-part of application No. 07/858,662, said application No. 08/260,333, is a continuation-in-part of application No. 08/209,400, Mar. 14, 1994, abandoned, which is a continuation-in-part of application No. 08/175,523, said application No. 08/341,365, is a continuation-in-part of application No. 08/175,523.

[51] Int. Cl.⁷ .................................................. B32B 15/20
[52] U.S. Cl. ........................................ 428/647; 428/939
[58] Field of Search .................................. 428/647, 941, 428/610, 939, 937

[56] References Cited

U.S. PATENT DOCUMENTS 84,205 11/1868 Mills .
169,810 11/1875 Holden .

(List continued on next page.)

FOREIGN PATENT DOCUMENTS 674003 11/1963 Canada .
12437 6/1979 European Pat. Off. .

(List continued on next page.)

OTHER PUBLICATIONS

Standard Specification for Solder Metal; American Society for Testing and Materials; pp. 1 & 9, Nov. 1986.

(List continued on next page.)

*Primary Examiner*—John J. Zimmerman
*Attorney, Agent, or Firm*—Vickers, Daniels & Young

[57] ABSTRACT

A corrosion-resistant coated copper metal coated with an alloy of tin wherein the tin content constitutes a majority of the alloy. The tin alloy may also include one or more metal additives to improve the coating process and/or to alter the properties of the tin alloy. A metal layer may be applied to the surface of the copper metal prior to applying the tin alloy. The copper material may be pre-treated prior to coating to remove surface oxides. The coating of the tin alloy involves heat to thereby form a heat created intermetallic layer. The coated copper metal can be subsequently treated with a passivation solution to remove the coated tin alloy and expose the intermetallic layer. The intermetallic layer includes copper and tin and exhibits excellent corrosion resistant properties.

28 Claims, 4 Drawing Sheets

U.S. PATENT DOCUMENTS

| | | |
|---|---|---|
| 347,928 | 8/1886 | Farmer . |
| 616,613 | 12/1898 | Griffith . |
| 863,058 | 8/1907 | Ellis . |
| 941,835 | 11/1909 | Wirgovits . |
| 1,156,169 | 10/1915 | Monnot . |
| 1,239,785 | 9/1917 | Gardiner . |
| 1,989,925 | 2/1935 | Hoover . |
| 2,004,372 | 6/1935 | Luschenowsky . |
| 2,069,658 | 2/1937 | Renkin . |
| 2,210,593 | 11/1940 | McCullough . |
| 2,233,578 | 3/1941 | Boak . |
| 2,252,414 | 8/1941 | Riesmeyer . |
| 2,258,327 | 10/1941 | Kramer . |
| 2,374,926 | 5/1945 | Fink . |
| 2,472,402 | 6/1949 | Boyle . |
| 2,533,048 | 12/1950 | Rodgers . |
| 2,703,766 | 3/1955 | Ellis . |
| 2,806,622 | 9/1957 | Leirer . |
| 2,863,766 | 12/1958 | Larkins . |
| 2,864,733 | 12/1958 | Kranich . |
| 2,884,350 | 4/1959 | Saubestre . |
| 3,012,310 | 12/1961 | Godfrey . |
| 3,058,856 | 10/1962 | Miller . |
| 3,105,022 | 9/1963 | Boggs . |
| 3,231,127 | 1/1966 | Virzi . |
| 3,331,230 | 7/1967 | Bentz . |
| 3,630,792 | 12/1971 | Smyth . |
| 3,728,144 | 4/1973 | Poucke . |
| 3,791,801 | 2/1974 | Ariga et al. . |
| 3,860,438 | 1/1975 | Shoemaker . |
| 3,962,501 | 6/1976 | Ohbu et al. . |
| 3,966,564 | 6/1976 | Hyner et al. . |
| 4,015,950 | 4/1977 | Galland et al. . |
| 4,026,728 | 5/1977 | Yoshida et al. . |
| 4,049,481 | 9/1977 | Morisaki . |
| 4,126,450 | 11/1978 | Lathrop et al. . |
| 4,152,471 | 5/1979 | Schnedler et al. . |
| 4,173,663 | 11/1979 | Bostroem . |
| 4,177,326 | 12/1979 | Windal et al. . |
| 4,184,928 | 1/1980 | Hoije . |
| 4,190,504 | 2/1980 | Usui . |
| 4,202,921 | 5/1980 | Enghag . |
| 4,216,250 | 8/1980 | Nakayama et al. . |
| 4,321,289 | 3/1982 | Bartsch . |
| 4,330,574 | 5/1982 | Pierson et al. . |
| 4,357,027 | 11/1982 | Zeitlow . |
| 4,416,920 | 11/1983 | Pierson et al. . |
| 4,441,118 | 4/1984 | Fister et al. .................. 357/70 |
| 4,451,541 | 5/1984 | Beal . |
| 4,599,279 | 7/1986 | Mirra et al. . |
| 4,695,428 | 9/1987 | Ballentine et al. . |
| 4,713,144 | 12/1987 | Schiller .................. 156/656 |
| 4,758,407 | 7/1988 | Ballentine et al. . |
| 4,778,733 | 10/1988 | Lubrano et al. . |
| 4,806,309 | 2/1989 | Tulman . |
| 4,814,049 | 3/1989 | Helton et al. . |
| 4,862,825 | 9/1989 | Fontaine . |
| 4,879,096 | 11/1989 | Vaton . |
| 4,883,723 | 11/1989 | Kilbane et al. . |
| 4,934,120 | 6/1990 | Boyd . |
| 4,969,980 | 11/1990 | Yoshioka et al. . |
| 4,987,716 | 1/1991 | Boyd . |
| 4,999,258 | 3/1991 | Wake et al. . |
| 5,017,267 | 5/1991 | Cordani .................. 156/656 |
| 5,023,113 | 6/1991 | Boston et al. . |
| 5,035,749 | 7/1991 | Haruta et al. ............. 134/2 |
| 5,053,112 | 10/1991 | Jones et al. . |
| 5,094,813 | 3/1992 | Kale . |
| 5,114,799 | 5/1992 | Ohashi et al. . |
| 5,134,039 | 7/1992 | Alexander et al. . |
| 5,175,026 | 12/1992 | Bertol et al. . |
| 5,202,002 | 4/1993 | Tsuchinaga et al. . |
| 5,203,985 | 4/1993 | Nishimura et al. . |
| 5,314,758 | 5/1994 | Carey, II et al. . |
| 5,354,624 | 10/1994 | Carey, II . |
| 5,395,702 | 3/1995 | Carey, II et al. . |
| 5,395,703 | 3/1995 | Carey, II et al. . |
| 5,397,652 | 3/1995 | Carey, II et al. . |
| 5,401,586 | 3/1995 | Carey, II et al. . |
| 5,429,882 | 7/1995 | Carey, II et al. . |
| 5,433,839 | 7/1995 | Amelot et al. . |
| 5,470,667 | 11/1995 | Carey, II et al. . |
| 5,480,731 | 1/1996 | Carey, II et al. . |
| 5,489,490 | 2/1996 | Carey, II et al. . |
| 5,491,035 | 2/1996 | Carey, II et al. . |
| 5,491,036 | 2/1996 | Carey, II et al. . |
| 5,492,772 | 2/1996 | Carey, II et al. . |
| 5,492,776 | 2/1996 | Paz-Pujalt et al. . |
| 5,520,964 | 5/1996 | Carey, II et al. . |
| 5,666,644 | 9/1997 | Tanaka et al. .................. 428/553 |
| 5,695,822 | 12/1997 | Carey, II et al. . |
| 5,755,950 | 5/1998 | Bell .................. 305/445 |
| 5,916,695 | 6/1999 | Fister et al. .................. 428/647 |

FOREIGN PATENT DOCUMENTS

| | | |
|---|---|---|
| 261078 | 9/1987 | European Pat. Off. . |
| 269006 | 11/1987 | European Pat. Off. . |
| 413261 A2 | 2/1991 | European Pat. Off. . |
| 480122 | 4/1992 | European Pat. Off. . |
| 704909 | 5/1931 | France . |
| 746337 | 5/1933 | France . |
| 1130210 | 4/1955 | France . |
| 1457769 | 9/1966 | France . |
| 2052324 | 3/1971 | France . |
| 2314949 | 4/1974 | France . |
| 2281995 | 8/1974 | France . |
| 2554831 | 5/1985 | France . |
| 139925 | 12/1934 | Germany . |
| 2713196 | 10/1978 | Germany . |
| 4309500 | 9/1993 | Germany . |
| 17-18219 | 9/1942 | Japan . |
| 49-34230 | 5/1974 | Japan . |
| 55-158825 | 12/1980 | Japan . |
| 56-69340 | 6/1981 | Japan . |
| 58-48694 | 3/1983 | Japan . |
| 58-64498 | 4/1983 | Japan . |
| 58-221283 | 12/1983 | Japan . |
| 59-41430 | 3/1984 | Japan . |
| 59-96238 | 6/1984 | Japan . |
| 60-208465 | 10/1985 | Japan . |
| 61-16428 | 4/1986 | Japan . |
| 1-259153 | 10/1989 | Japan . |
| 4-214848 | 8/1992 | Japan . |
| 4-247860 | 9/1992 | Japan . |
| 40-6969 | 4/1965 | Spain . |
| 386733 | 6/1973 | U.S.S.R. . |
| 640831 | 1/1979 | U.S.S.R. . |
| 546179 | of 0000 | United Kingdom . |
| 2813 | 11/1857 | United Kingdom . |
| 131299 | 8/1919 | United Kingdom . |
| 228995 | 2/1925 | United Kingdom . |
| 237224 | 12/1925 | United Kingdom . |
| 244523 | 12/1925 | United Kingdom . |
| 528558 | 10/1932 | United Kingdom . |
| 581604 | 10/1946 | United Kingdom . |

| | | |
|---|---|---|
| 601209 | 4/1948 | United Kingdom . |
| 626826 | 7/1949 | United Kingdom . |
| 629425 | 9/1949 | United Kingdom . |
| 642122 | 8/1950 | United Kingdom . |
| 707765 | 4/1954 | United Kingdom . |
| 709163 | 5/1954 | United Kingdom . |
| 786651 | 11/1957 | United Kingdom . |
| 796128 | 6/1958 | United Kingdom . |
| 927530 | 5/1963 | United Kingdom . |
| 1008316 | 10/1965 | United Kingdom . |
| 1040916 | 9/1966 | United Kingdom . |
| 1074852 | 7/1967 | United Kingdom . |
| 1143107 | 2/1969 | United Kingdom . |
| 1178816 | 1/1970 | United Kingdom . |
| 1194751 | 6/1970 | United Kingdom . |
| 1277523 | 6/1972 | United Kingdom . |
| 1361942 | 7/1974 | United Kingdom . |
| 1419534 | 12/1975 | United Kingdom . |
| 1439774 | 6/1976 | United Kingdom . |
| 1448662 | 9/1976 | United Kingdom . |
| 1513002 | 6/1978 | United Kingdom . |
| 1517454 | 7/1978 | United Kingdom . |
| 2005307 | 4/1979 | United Kingdom . |
| 2055158 | 2/1981 | United Kingdom . |
| 2055402 | 3/1981 | United Kingdom . |
| 1588808 | 4/1981 | United Kingdom . |
| 2099857 | 1/1982 | United Kingdom . |
| 2087931 | 6/1982 | United Kingdom . |
| 2117414 | 10/1983 | United Kingdom . |
| 2242696 | 10/1991 | United Kingdom . |
| 2265389 | 9/1993 | United Kingdom . |
| 2276887 | 10/1994 | United Kingdom . |

OTHER PUBLICATIONS

Soldering Manual; American Welding Society; 1959; pp. 21–23. (No month).

The Making, Shaping and Treating of Steel, U.S. Steel Corporation, 1957, pp. 655–659. (No month).

Constitution of Binary Alloys; McGraw–Hill Book Company; 1958; pp. 1217–1219. (No month).

Metal Handbook, 10th Ed.; vol. 2, Properties and Selection; Nonferrous Alloys and Special–Purpose Materials; ASM; pp. 1166–1168; Oct. 1990.

Design for Metal Spinning; Tin–Zinc Alloy Coatings; Materials and Methods; pp. 1248, 1250; Jul. 1946.

"Tin–Zinc Alloy Coatings", Materials & Methods, pp. 1248–1250, Jul. 1946.

Federal Specification QQ–T–201F, Nov. 12, 1986, "Terne Plate, for Roofing and Roofing Products", pp. 1–8.

Hot Dip Tin Coating of Steel and Cast Iron, Metals Handbook; 9th Ed., vol. 5, 1983, pp. 351–355. (No month).

"Handbook of Stainless Steels", McGraw–Hill Book Company, Chapter 35 "The Cleaning of Stainless Steels", 35–1–35–16, 1977. (No month).

Metals Handbook Ninth Edition, vol. 5, Surface Cleaning, Finishing, and Coating, "Pickling of Iron Steel", pp. 68–82; "Hot Dip Galvanized Coatings", pp. 323–332; "Hot Dip Tin Coating of Steel Cast Iron", pp. 351–355; "Hot Dip Lead Alloy Coating of Steel", pp. 358–360; "Cleaning and Finishing of Stainless Steel", pp. 551–554; Oct. 1982.

*Metals Handbook*, The American Society for Metals, "Metallic Coatings", pp. 703–721; "Surface Treatments", pp. 725–732; "Tin and Tin Alloys", pp. 1063–1076; "Zinc and Zinc Alloys", pp. 1077–1092, 1958. (No Month).

Van Nostrand's Scientific Encyclopedia, 6th Edition, vol. 1, 1983; pp. 94–96—Definition of "Alloys"; p. 1322—Definition of "Galvanizing". (No Month).

Van Nostrand's Scientific Encyclopedia, 6th Edition, vol. 11, 1983; pp. 2832–2834—Definition of "Tin"; pp. 3059–3062—Definition of "Zinc". (No month).

McGraw–Hill Encyclopedia of Science and Technology, 6th Edition, 1987, p. 517. (No month).

McGraw–Hill Encyclopedia of Science & Technology, 6th Edition, 1987, pp. 35–37; pp. 44–46. (No month).

McGraw–Hill Encyclopedia of Science & Technology, 6th Edition, 1987, pp. 368–372. (No month).

McGraw–Hill Encyclopedia of Science & Technology, 6th Edition, 1987, pp. 618–623. (No month).

Great Britain Search Report dated May 22, 1995, for GB Application 9504712.2.

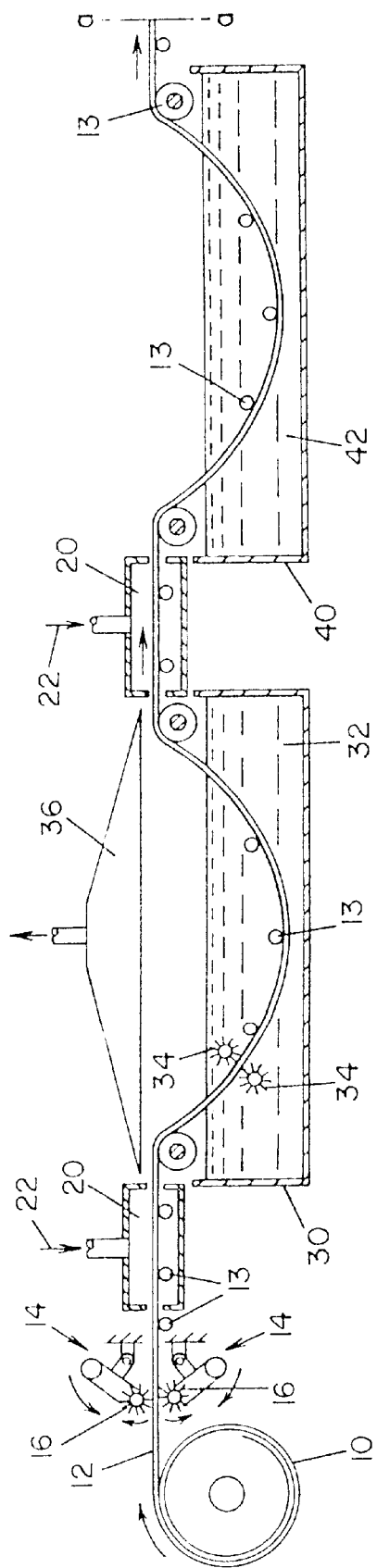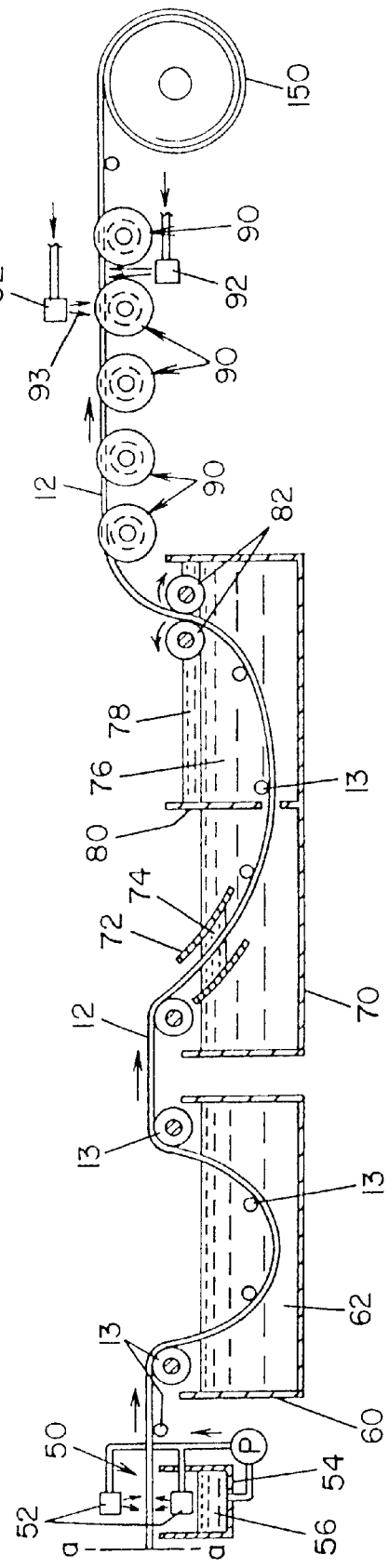
FIG. 1A
FIG. 1B

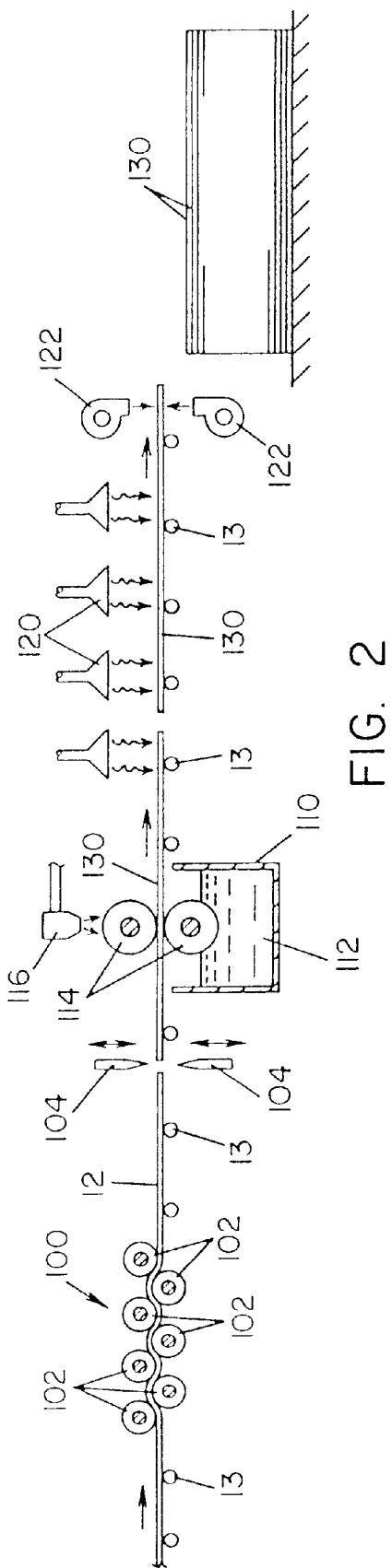
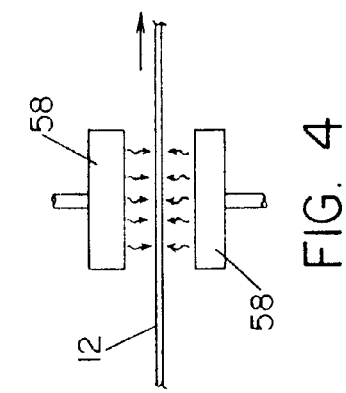
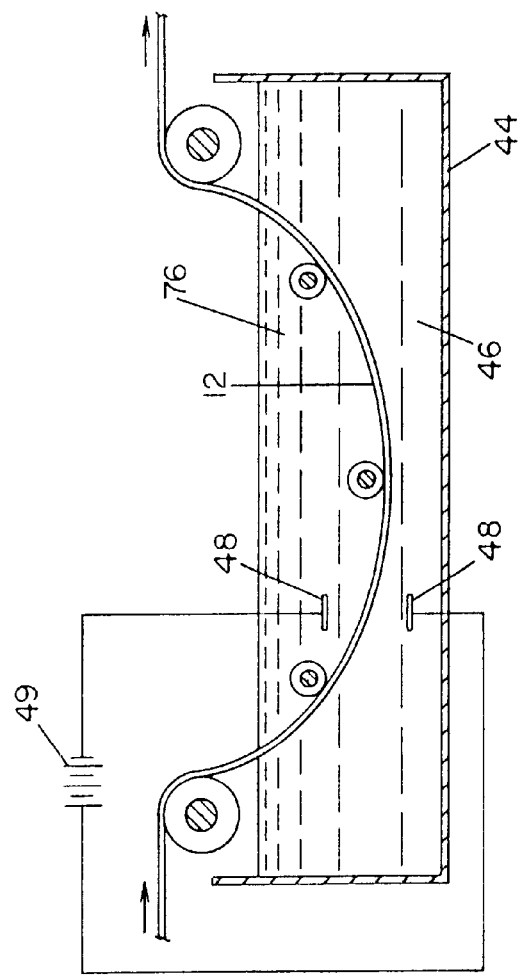

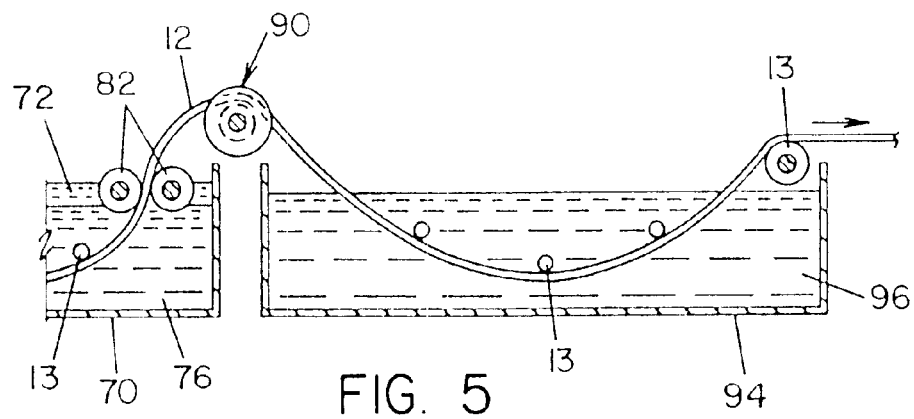
FIG. 5
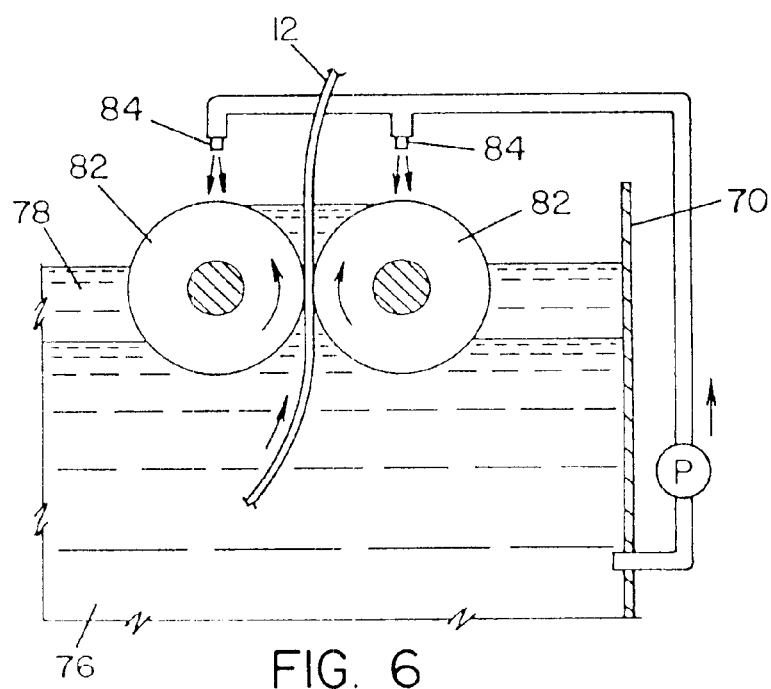
FIG. 6
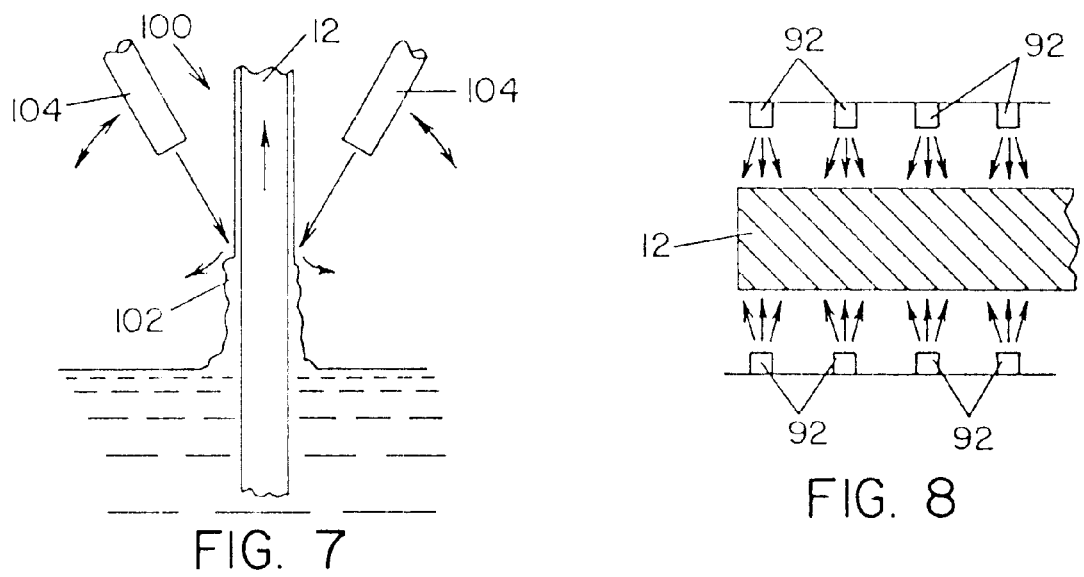
FIG. 7
FIG. 8

CORROSION-RESISTANT COATED COPPER METAL AND METHOD FOR MAKING THE SAME

This patent application is also a continuation-in-part of co-pending U.S. patent application Ser. No. 08/929,623, filed Sep. 15, 1997, which in turn is a continuation-in-part of U.S. Pat. No. 5,667,849 (08/604,074—filed Feb. 20, 1996), which in turn is a continuation of U.S. Pat. No. 5,616,424 (08/551,456—filed Nov. 1, 1995), which in turn is a continuation of U.S. Pat. No. 5,491,036 (08/402,925—filed Mar. 13, 1995), which in turn is a continuation-in-part of U.S. Pat. No. 5,480,731 Ser. No. (08/380,372—filed Jan. 30, 1995), which in turn is a continuation-in-part of U.S. Pat. No. 5,395,703 Ser. No. (08/153,026—filed Nov. 17, 1993), which in turn is a continuation of U.S. Pat. No. 5,314,758 Ser. No. (07/858,662—filed Mar. 27, 1992).

This patent application is also a continuation-in-part of co-pending U.S. patent application Ser. No. 08/929,623, filed Sep. 15, 1997, which in turn is a continuation-in-part of U.S. Pat. No. 5,667,849 Ser. No. (08/604,074—filed Feb. 20, 1996), which in turn is a continuation of U.S. Pat. No. 5,616,424 Ser. No. (08/551,456—filed Nov. 1, 1995), which in turn is a continuation of U.S. Pat. No. 5,491,036 Ser. No. (08/402,925—filed Mar. 13, 1995), which in turn is a continuation-in-part of U.S. Pat. No. 5,491,035 Ser. No. (08/347,261—filed Nov. 30, 1994), which in turn is a continuation-in-part of U.S. Pat. No. 5,401,586 Ser. No. (08/175,523 filed Dec. 30, 1993), which in turn is a continuation-in-part of U.S. patent application Ser. No. 08/154,376, filed Nov. 17, 1993, now abandoned, which in turn is a continuation of U.S. patent application Ser. No. 08/042,649, filed Apr. 5, 1993, now abandoned.

This patent application is further a continuation-in-part of co-pending U.S. patent application Ser. No. 08/929,623, filed Sep. 15, 1997, which in turn is a continuation-in-part of U.S. Pat. No. 5,667,849 Ser. No. (08/604,074—filed Feb. 20, 1997), which in turn is a continuation of U.S. Pat. No. 5,616,424 Ser. No. (08/551,456—filed Nov. 1, 1995), which in turn is a continuation of U.S. Pat. No. 5,491,036 Ser. No. (08/402,925—filed Mar. 13, 1995), which in turn is a continuation-in-part of U.S. Pat. No. 5,397,652 Ser. No. (08/165,085—filed Dec. 10, 1993), which in turn is a continuation-in-part of U.S. patent application Ser. No. 08/000,101, filed Jan. 4, 1993, now abandoned, which in turn is a continuation-in-part of U.S. Pat. No. 5,314,758 Ser. No. (07/858,662—filed Mar. 27, 1992).

This patent application is still further a continuation-in-part of co-pending U.S. patent application Ser. No. 08/929,623, filed Sep. 15, 1997, which in turn is a continuation-in-part of U.S. Pat. No. 5,667,849 Ser. No. (08/604,074—filed Feb. 20, 1996), which in turn is a continuation of U.S. Pat. No. 5,616,424 Ser. No. (08/551,456—filed Nov 1, 1995), which in turn is a continuation of U.S. Pat. No. 5,491,036 Ser. No. (08/402,925—filed Mar. 13, 1995), which in turn is a continuation-in-part of U.S. Pat. No. 5,429,882 Ser. No. (08/260,333—filed Jun. 15, 1994), which in turn is a continuation-in-part of U.S. patent application Ser. No. 08/209,400, filed Mar. 14, 1994, now abandoned, which in turn is a continuation-in-part of U.S. Pat. No. 5,401,586 Ser. No. (08/175,523 filed Dec. 30, 1993), which in turn is a continuation-in-part of U.S. application Ser. No. 08/154,376, filed Nov. 17, 1993, now abandoned, which in turn is a continuation of U.S. patent application Ser. No. 08/042,649, filed Apr. 5, 1993, now abandoned.

This patent application is yet still further a continuation-in-part of co-pending U.S. patent application Ser. No. 08/929,623, filed Sep. 15, 1997, which in turn is a continuation-in-part of U.S. Pat. No. 5,667,849 Ser. No. (08/604,074—filed Sep. 16, 1997), which in turn is a continuation of U.S. Pat. No. 5,616,424 Ser. No. (08/551,456—filed Nov. 1, 1995), which in turn is a continuation of U.S. Pat. No. 5,491,036 Ser. No. (08/402,925—filed Mar. 13, 1995), which in turn is a continuation-in-part of U.S. Pat. No. 5,489,490 Ser. No. (08/341,365—filed Nov. 17, 1994), which in turn is a continuation-in-part of U.S. Pat. No. 5,401,586 Ser. No. (08/175,523 filed Dec. 30, 1993), which in turn is a continuation-in-part of U.S. patent application Ser. No. 08/154,376, filed Nov. 17, 1993, now abandoned, which in turn is a continuation of U.S. patent application Ser. No. 08/042,649, filed Apr. 5, 1993, now abandoned.

This patent application is a continuation-in-part of co-pending U.S. patent application Ser. No. 08/929,623, filed Sep. 15, 1997, which in turn is a continuation-in-part of U.S. Pat. No. 5,667,849 Ser. No. (08/604,074—filed Feb. 20, 1996), which in turn is a continuation of U.S. Pat. No. 5,616,424 Ser. (08/551,456—filed Nov. 1, 1995), which in turn is a continuation of U.S. Pat. No. 5,491,036 Ser. No. (08/402,925—filed Mar. 13, 1995), which in turn is a continuation-in-part of U.S. Pat. No. 5,402,925—filed Mar. 13, 1995), which is in turn a continuation-in-part of U.S. Pat. No. 5,491,035 Ser. No. (08/347,261—filed Nov. 30, 1994), which in turn is a continuation-in-part of U.S. Pat. No. 5,401,586 Ser. No. (08/175,523 filed Dec. 30, 1993), which is in turn a continuation of U.S. patent application Ser. No. 08/154,376, filed Nov. 17, 1993, now abandoned, which in turn is a continuation of U.S. patent application Ser. No. 08/042,649, filed Apr. 5, 1993, now abandoned.

This patent application is further a continuation-in-part of co-pending U.S. patent application Ser. No. 08/929,623, filed Sep. 15, 1997, which in turn is a continuation-in-part of U.S. Pat. No. 5,695,822 Ser. No. (08/604,074—filed Feb. 20, 1996), which in turn is a continuation of U.S. Pat. No. 5,597,656 Ser. No. (08/438,042—filed May 8, 1995), which in turn is a continuation-in-part of U.S. Pat. No. 5,470,667 Ser. No. (08/338,386—filed Nov 14. 1994), which in turn is a continuation of U.S. Pat. No. 5,401,586 Ser. No. (08/175, 523 filed Dec. 30, 1993), which in turn is a continuation-in-part of U.S. patent appalication Ser. No. 08/154,376, filed Nov. 17, 1993, now abandoned, which in turn is a continuation of U.S. patent application Ser. No. 08/042,649, filed Apr. 5, 1993, now abandoned.

This patent application is still further a continuation-in-part of co-pending U.S. patent application Ser. No. 08/980, 985, filed Oct. 20, 1997 which in turn is a continuation of U.S. patent application Ser. No. 08/636,179, filed Apr. 22, 1996, now abandoned, which in turn is a continuation-in-part of U.S. Pat. No. 5,616,424 Ser. No. (08/551,456—filed Nov. 1, 1995), which in turn is a continuation of United U.S. Pat. No. 5,491,036 Ser. No. (08/402,925—filed Mar. 13, 1995), which in turn is a continuation-in-part of U.S. Pat. No. 5,480,731 Ser. No. (08/380,372—filed Jan. 30, 1995), which is in turn a continuation of U.S. Pat. No. 5,395,703 Ser. No. (08/153,026—filed Nov. 17, 1993), which in turn is a continuation of U.S. Pat. No. 5,314,758 Ser. No. (07/858, 662—filed Mar. 27, 1992).

The present invention relates to the art of a corrosion-resistant metal material and more particularly to a coated copper metal which is coated with a tin alloy that is environmentally friendly, has long life and resists corrosion.

INCORPORATION BY REFERENCE

As background material so that the specification need not specify in detail what is known in the art, U.S. Pat. Nos.

5,314,758; 5,354,624; 5,397,652; 5,491,035; 5,491,036; 5,429,882 and 5,597,656 and U.S. application Ser. No. 929,623, filed Sep. 15, 1997 are incorporated herein by reference to illustrate various processes that can be used to coat and treat coated metals.

BACKGROUND OF THE INVENTION

The present invention relates to the art of a corrosion-resistant metal material such as a coated metal, which corrosion-resistant coated metal can be used in a wide variety of applications such as, for example, used for architectural materials, gasoline tanks, automotive products, appliances, etc.; however, the invention has broader applications and relates to various coating alloy compositions based primarily upon tin and several novel methods and processes used therein such as plating and/or heating (i.e flow heating, hot dip coating, metal spraying), pretreatment of the metal material prior to coating, applying an intermediate metal layer prior to coating, controlling coating thickness, and post-treating the coated metal material (i.e. weather treating, oxidizing coating, passivating intermetallic layer, rolling or cutting processed material).

Over the years, architectural materials, such as metal roofing systems and metal siding systems, made of pliable metals in various sheet gauge thicknesses have been used. Metals such as carbon steel, stainless steel, copper and aluminum are the most popular types of metal used for such architectural materials.

Architectural metal materials made of carbon steel were commonly treated with corrosion-resistant coatings to prevent rapid oxidation of the metal surface, thereby extending the life of the materials. A popular corrosion-resistant coating for carbon steel is a terne coating. Terne coating of stainless steel and copper is also produce, but is much less prevalent than carbon steel due to the natural corrosion-resistant properties of stainless steel and copper. Terne coating has been the predominate and the most popular coating for carbon steel materials due to its relatively low cost, ease of application, excellent corrosion-resistant properties and desirable colorization during weathering.

Terne or terne alloy is a term commonly used to describe an alloy containing about 80% lead and the remainder tin. The terne alloy is conventionally applied to the metals by a hot dip process wherein the base metal is immersed into a molten bath of terne metal by a continuous or batch process. Although terne coated metals have excellent corrosion-resistant properties and have been used in various applications, terne coated materials have recently been questioned due to environmental concerns. Terne coated metals contain a very high percentage of lead. Although the lead in terne alloys is stabilized, there is concern about leaching of the lead from the terne alloy. Environmental and public safety laws have been proposed and/or passed in various communities prohibiting or penalizing the user of materials containing lead. Another disadvantage of terne coated materials is the softness of the terne layer. As noted, terne coated metal sheets are commonly formed into varying shapes. The machines that bend the metal sheets periodically damage the terne coating during bending process. The terne coating is susceptible to damage due to the abrasive nature of the forming machines. The terne alloy has a further disadvantage in that the newly applied terne is very shiny and highly reflective. As a result, the highly reflective coating cannot be used on buildings or roofing systems such as at airports and military establishments. The terne coating eventually loses its highly reflective properties as the components within the terne coating are reduced (weathered); however, the desired amount of reduction takes approximately 1–½ to 2 years when the terne coating is exposed to the atmosphere, thus requiring the terne metals to be stored over long periods of time prior to being used in these special areas. The storage time is significantly prolonged when the terne coated materials are stored in rolls and the rolls are protected from the atmosphere.

Tin coating of carbon steel and stainless steel for architectural materials is disclosed in U.S. Pat. No. 5,314,758. Tin coating of copper for architectural materials is disclosed in 5,354,624. The most popular process for applying a tin coating to these metals is by an electroplating process. In an electroplating process, the coating thickness is very thin and typically ranges between 0.3 microns to 30 microns ($1.2\times 10^{-5}$ to $1.2\times 10^{-3}$ in.). Such process typically resulted in thin tin layer having a network of small pinholes making the strip generally unacceptable for corrosion-resistant uses. Such electroplated strip may include a base flash layer and/or a cover coating to overcome the pinhole problems inherent with an electroplating process. The tin plated layer is also susceptible to flaking or being scrapped off when the plated strip is drawn and formed into various components. The pinholes and/or flaking off or scraping off of the tin coating is very problematic since tin is not electroprotective under oxidizing conditions. Consequently, discontinuities in the tin coating result in the corrosion of the exposed metal. Tin coatings have the further disadvantage of having a highly-reflective surface. As a result, materials coated with a tin coating cannot be used in an environment where highly-reflective materials are undesirable until the coated materials are further treated (i.e. paint) or the tin is allowed time to oxidize.

Coating base metals with zinc metal, commonly known as galvanization, is another popular metal treatment to inhibit corrosion. Zinc is a relatively low cost material, which is easy to apply (i.e. hot-dip application) and has excellent corrosion resistance. Zinc is also electroprotective under oxidizing conditions to prevent the exposed metal, due to discontinuities in the zinc coating, from rapidly corroding.

However, zinc coatings have several disadvantages that make it undesirable for many types of applications. Although zinc coatings will bond to many types of metals, the bond is not strong and results in the zinc coating flaking off. Zinc also does not form a uniform and/or thick coating in a hot-dip and spray metal process. As a result, discontinuities of the coating are usually found when coating by these processes. Zinc is also a very rigid and brittle metal and tends to crack and/or flake off when the zinc coated materials are formed, i.e. press fitted and/or drawn. When zinc oxidizes, the zinc coating forms a white powdery texture (zinc oxide) which color is unacceptable in many applications.

The use of copper base metals for architectural matters and the like present unique challenges. Copper is typically more corrosion resistant than carbon steel in many environments. However, when copper oxidizes, the oxide forms a green or blue-green layer. This color change is unacceptable in a variety of applications. As disclosed in U.S. Pat. No. 5,354,624, copper base materials can be coated with a tin alloy to form a corrosion resistant material that is pliable and that does not form a green or blue-green layer during oxidation. Although the coating of a tin alloy on copper base materials overcame many of the problems associated with copper materials, the addition of the tin alloy reduces the pliability of the coated copper and forms a highly reflective coating that requires further treating for use in various applications.

Due to the various environmental concerns and problems associated with corrosion-resistant coatings applied to copper materials and the problems associated with the forming of the coated copper material into various types of components, there has been a demand for a copper material that is corrosion-resistant, is environmentally friendly, resists damage during forming, is very pliable, does not oxidize to produce an undesirable color, and is not highly reflective.

SUMMARY OF THE INVENTION

The present invention relates to a product and method of producing a corrosion-resistant, environmentally friendly metal material. More specifically, the invention relates to the product and method of producing a corrosion resistant copper material. Even more specifically, the invention relates to the coating of a copper base metal, such as a copper metal strip, with a tin alloy to form a corrosive-resistant barrier on the copper metal and subsequently removing the tin alloy to expose a corrosion-resistant, heat created intermetallic layer.

In accordance with the principal feature of the invention, there is provided a base metal made substantially of copper, i.e. over 50% copper, which is coated with a corrosion-resistant metal alloy. The metal alloy is an alloy primarily of tin.

In accordance with another aspect of the present invention, the copper base metal is coated with an intermediate metal layer prior to the tin alloy being coated onto the copper base metal. Preferably, the copper base metal is plated, plated and subsequently flow heated, metal sprayed or hot dipped with the intermediate metal layer. The intermediate metal layer provides additional corrosion resistance to the copper base material, especially against halogens such as chlorine. The intermediate metal layer preferably is tin, nickel, copper or chromium. Other metals such as aluminum, cobalt, molybdenum, Sn—Ni or Fe—Ni can be used. The intermediate metal layer is applied to the copper base metal to form a very thin metal layer. Although the tin alloy coating provides excellent protection against most corrosion-producing elements and compounds, the inclusion of the intermediate metal layer enhances the bonding and/or corrosion resistant characteristics of the tin alloy. The intermediate metal layer can also be applied to alter the composition of the heat created intermetallic layer which is formed between the copper base metal and tin alloy. If used, the nickel is preferably flashed or plated to the copper surface. The nickel layer has been found to provide an essentially impenetrable barrier to elements and/or compounds which penetrate the tin alloy. The thickness of the nickel layer is preferably maintained at an ultra-thin thicknesses while still maintaining the ability to prevent corrosion inducing components from contacting the copper base material. Chromium, aluminum, cobalt, molyboenum, Sn—Ni , Fe—Ni, if used, are preferably plated to the copper base material by a plating process. Tin, if used, is preferably coated onto the copper base material by hot dipping, plating or metal spraying.

In accordance with still another aspect of the present invention, the plated intermediate metal layer is pre-heated and/or flow heated prior to the tin alloy being applied to the copper base material. The heating of the intermediate layer causes a psuedo intermetallic layer to form between the intermediate layer and the base metal. Such a pre-heating process results in improved bonding of the intermediate layer to the copper base material.

In accordance with another aspect of the invention, the tin alloy is plated and subsequently heated and/or flow heated, hot dip coated, hot dip coated and/or spray coated onto the surface of the copper base material.

In accordance with the broad aspect of the invention, the tin alloy primarily includes tin. The tin alloy preferably contains a low lead content. Preferably, the tin alloy contains no more than about 2 percent lead, more preferably less than about 0.5 percent lead, even more preferably no more than about 0.05 percent lead and still more preferably less than 0.01 percent lead. The tin alloy provides a corrosion-resistant coating that protects the surface of the copper base material from oxidation and is environmentally friendly, thus immune from the prejudices associated with lead containing alloys. The tin content of the tin alloy is at least about 90 weight percent of the tin alloy, more preferably at least about 95 weight percent of the tin alloy, even more preferably at least about 98 weight percent of the tin alloy and even more preferably at least about 99 weight percent of the tin alloy. The tin alloy is corrosion-resistant in rural, industrial and marine environments. Chloride salts are common in marine environments while sulfur containing compounds are common to industrial environments. Rural areas are usually the least corrosive of all three environments. The tin alloy has excellent low temperature properties; resists degradation by solar energy; can be easily formed into various shapes; and can be installed in any type of weather. The tin alloy is environmentally safe and friendly. Furthermore, the tin alloy is a safe material to be used in the human environment. The tin alloy is a cost effective material in structures erected in corrosive environments, in the tropics and other areas where buildings are exposed to strong, warm sea winds or corrosive fumes since the tin alloy is highly reliable and environmentally safe in marine environments. The tin alloy can be formed, drawn and soldered. The tin also can be painted or colored by standard coating processes.

In accordance with another aspect of the invention, bismuth, antimony, nickel, lead, silver, arsenic, cadmium, manganese, chromium, aluminum, silicon, boron, carbon, molybdenum, vanadium, chromium, titanium, sulfur, potassium, cyanide, tellurium, phosphorous, fluoride, chlorine, bromine, nitrogen, copper, iron and/or magnesium are added to the tin alloy to enhance the mechanical properties of the tin alloy, improve corrosion resistance of the tin alloy, improve grain refinement of the tin alloy, alter the color of the tin alloy, alter the reflectiveness of the tin alloy, inhibit oxidation of the tin alloy during coating and/or in various types of environments, inhibit dross formation during coating, stabilize the tin alloy, improve the bonding of the tin alloy to the copper base material and/or intermediate layers on the copper base material, improve the flowability of the tin alloy during coating and/or reduce or inhibit the crystallization of the tin in the tin alloy. The believed functions of the alloying agents are described below; however, the alloying agents may have additional functions. The tin alloy preferably contains metal stabilizing additives. When tin crystallizes, the bonding of the tin alloy to the copper base material can weaken and result in flaking of the coating. The addition of small amounts of stabilizing metals, such as bismuth, antimony, cadmium, copper and mixtures thereof prevent and/or inhibit the crystallization of the tin. Bismuth, antimony, cadmium and/or copper also alter the mechanical properties (i.e. formability, hardness, flowability, strength, flexibility, durability) and corrosion resistant properties of the tin alloy. Nickel additions to the tin alloy have been found to provide additional corrosion protection to the tin alloy especially in alcohol containing environments. The addition of nickel also alters the mechanical properties of the tin alloy. Copper can be added to the tin alloy, in addition to its stabilizing properties, to alter the mechanical properties of the tin alloy, to alter the color of the tin alloy, and to alter the reflective properties of the tin alloy. Copper additions also improve the corrosion-resistance of the tin alloy especially in marine environments. Magnesium additions to the tin alloy alter the mechanical properties of the tin alloy such as improving the flow or coating properties of the tin alloy so that a uniform and even coating is applied to the copper base material during coating, especially in a heated process such as hop dip coating, flow heating and/or metal spraying. Magnesium additions reduce the anodic characteristics of the tin alloy to improve the corrosion-resistance of the tin alloy. Magnesium additions also reduce the oxidation of the material alloy and/or reduce dross formation during the coating of the tin alloy when heated. Aluminum additions to the tin alloy helps to reduce oxidation of the molten tin alloy and/or to reduce dross formation during the coating of the tin alloy when heated (i.e. hot dip coating, flow heating, metal spraying). Aluminum additions also alter the reflective properties of the tin alloy and mechanical properties of the tin alloy. Aluminum additions can affect the thickness of the intermetallic layer formed during the heating of the tin alloy to improve the formability of the coated copper base material. Titanium additions to the tin alloy improve the grain refinement of the tin alloy, improve the mechanical properties of the tin alloy such as increase the hardness and the strength of the tin alloy, and improve the corrosion-resistance of the tin alloy. Titanium additions also reduce the amount of oxidation of the molten tin alloy and help reduce dross formation when the tin alloy is heated. Titanium additions also alter the reflective properties and color of the tin alloy. Titanium further can improve the bonding properties of the tin alloy to the copper base material. Iron additions to the tin alloy increase the hardness and other mechanical properties of the tin alloy, and alter the color of the tin alloy. Lead additions to the tin alloy can increase the corrosion-resistance of the tin alloy, alter the mechanical properties of the tin alloy, alter the color of the tin alloy, and improve the bonding of the tin alloy to the copper base material. Chromium additions to the tin alloy improve the corrosion-resistance of the tin alloy, alter the mechanical properties of the tin alloy, and alter the reflectivity of the tin alloy. Manganese additions to the tin alloy increase the corrosion-resistance of the tin alloy, increase the grain density of the tin alloy and improve the bonding of the tin alloy to the copper metal material. Cadmium additions to the tin alloy alter the mechanical properties of the tin alloy, alter the color of the tin alloy, alter the reflectiveness of the tin alloy, stabilize the tin in the tin alloy, improve the corrosion-resistance of the tin alloy, alter the grain refinement of the tin alloy, alter the oxidation of the tin alloy, and improve the bonding properties of the tin alloy to the copper metal material. Silver additions to the tin alloy alter the mechanical properties of the tin alloy and alter the color and reflective properties of the alloy. Arsenic additions to the tin alloy alter the mechanical properties of the tin alloy.

In accordance with another aspect of the present invention, the base metal material is a copper metal strip which is designed to be coated with the tin alloy. The thickness of the copper metal strip is preferably not more than about 0.25 inch and is preferably less than about 0.1 inch and more preferably less than about 0.05 inch and preferably greater than about 0.005 inch. The strip thickness must not be too great so as to prevent the strip from being directed, at a high speed, through the pretreatment process, if any, and the coating process. A "strip" is defined as metal that is shipped to the coating process in coils, as opposed to plates. Strip thicknesses which are less than about 0.005 inch may break as the strip passes at high speeds and/or under tension when being coated. The thickness of the strip is selected so that the formed or drawn coated copper strip is strong and durable enough for its intended end purpose.

In accordance with another aspect of the present invention, the copper base material is pretreated prior to applying the tin alloy. The pretreatment process typically includes pickling and/or chemical activation of the copper base material surface.

The pickling process is designed to remove a very thin surface layer from the copper base material. The removal of a very thin layer from the surface of the copper base material results in the removal of oxides and other foreign matter from the surface so as to form a strong bond and uniform coating on the copper base material.

The pickling process causes slight etching on the surface of the copper base material. The rate of etching is usually not the same throughout the surface thereby forming microscopic valleys on the copper base metal surface thereby increasing the surface area for which the tin coating alloy can bond to the surface of the copper base material. The pickling process includes the use of a pickling solution to remove and/or loosen oxides from the surface of the copper base material. The pickling solution contains one or more acids such as hydrofluoric acid, sulfuric acid, nitric acid, hydrochloric acid, phosphoric acid and/or isobromic acid. The control of the temperature of the pickling solution is important so as to produce the desired activity of the acid to remove the oxides from the surface of the copper base material. The temperature of the pickling solution is preferably maintained above about 80° F. and usually between about 120–140° F., and preferably about 128–133° F. Higher acid concentration and/or higher temperatures can increase the activity of the pickling solution. The temperature of the pickling solution and the substantially uniform acid concentration of the pickling solution is preferably maintained by stirring or recirculation, and more preferably by recirculation through heat exchanger. The pickling solution is preferably agitated to prevent the solution from stagnating, varying in concentration, varying in temperature, and/or to remove gas pockets which can form on the surface of the copper base material during the pickling process. Agitation of the pickling solution can be accomplished by placing agitators in the pickling tank and/or recirculating the pickling solution. Agitation brushes preferably are placed within the pickling tank to agitate the acid solution and to scrub the surface of the copper base material. Scrubbing the surface of the copper base material can increase the rate of removal of oxides from the surface of the copper base material. A single pickling tank is preferably used to activate, i.e. remove surface oxides, the copper base material. The total time for pickling the copper base material is preferably less than about 10 minutes, more preferably less than a minute, and even more preferably about 5 to 20 seconds. The copper base material is preferably processed in a continuous process by moving the metal strip through the pickling tank at a rate of about 1–400 ft/min, preferably between about 50 to 250 ft/min, thereby subjecting the copper strip to the pickling solution for less than about one minute. The oxide removal from the copper base material by the pickling process improves the bonding and coating thickness of the tin alloy.

An alternative to, or addition to the pickling process, the copper base material is treated in a chemical activation process. The chemical activation process can be skipped, the pickling process can be skipped and the copper base material can be chemically activated or the copper base material can be subjected to the pickling process and the chemical activation process. The chemical activation process removes oxides and foreign material from the copper base material by subjecting the surface of the copper base material to a deoxidizing agent. Various types of deoxidizing solutions can be used. Zinc chloride has been found to be an excellent deoxidizing solution. The zinc chloride acts as both a deoxidizer and a protective coating to prevent oxide formation on the surface of the copper base material. The temperature of the zinc chloride solution is preferably maintained at about ambient temperature (about 60–90° F.) and is preferably agitated to maintain a uniform solution concentration and temperature. Small amounts of acid can be added to the deoxidizing solution to further enhance oxide removal. The time the copper base material is subjected to the deoxidizing solution is usually less than about 10 minutes, and preferably less than 1 minute. The copper base material is preferably processed in a continuous process.

In accordance with another aspect of the invention, the copper base material is treated with an abrasive and/or absorbent material and/or subjected to a solvent or other type of cleaning solution to remove foreign materials and oxides from the surface of the copper base material. This treatment can be used in combination with or as an alternative to the pickling process and/or chemical activation process. The copper base material commonly has foreign debris on its surface. Such debris may consist of dirt, oil, glue, etc. Many of these foreign substances do not react with or are not readily removable by the pickling solution and/or chemical activation solution, thus adversely affect the removal of oxides from the copper base material. Treating the copper base material with an abrasive and/or absorbent material removes these foreign substances. The surface of the copper base material may be roughened by this process thereby further enhancing the activation of the copper base material during the pickling process and/or chemical activation process.

In accordance with another aspect of the present invention, the pretreatment process includes the maintaining of a low oxygen environment prior to and/or subsequent to subjecting the copper base material to the pickling process and/or chemical activation process and/or abrasion process. The maintenance of a low oxygen environment inhibits the formation and/or reformation of oxides on the surface of the copper base material. The low oxygen environment may take on several forms. Two examples of low oxygen environments are the formation of a low oxygen-containing gas environment about the copper base material or the immersion of the copper base material in a low oxygen-containing liquid environment. Both these environments act as a shield against atmospheric oxygen and prevent and/or inhibit oxides from forming on the surface of the copper base material. The copper base material may be totally, partially, or not subjected to a low oxygen environment during the pretreatment process. The non-oxidized surface of the copper base material is highly susceptible to re-oxidation when in contact with oxygen. By creating a low oxygen environment about the copper base matter, new oxide formation is inhibited and/or prevented. Examples of low oxygen gas environments include nitrogen, hydrocarbons, hydrogen, noble gasses and/or other non-oxidizing gasses. Preferably, nitrogen gas is used to form the low oxygen gas environment. Examples of low oxygen liquid environments include non-oxidizing liquids and/or liquids containing a low dissolved oxygen content. An example of the latter is heated water sprayed on the surfaces of the copper base material; however, the copper base material can be alternatively immersed in the heated water. The temperature of the heated water, if used, is preferably maintained above about 100° F. and preferably at least about 110° F. or greater so as to exclude the unwanted dissolved oxygen.

In accordance with still yet another aspect of the present invention, the copper base material is rinsed with a liquid after the copper base material exits the pickling process, chemical activation process and/or abrasion process. The liquid rinse is deigned to remove the pickling solution, chemical activation solution, and/or loosened debris from the surface of the copper base material. Pickling solution which remains on the copper base material can eat into the surface of the copper base material thereby resulting in pitting of the base metal. Debris and certain types of chemical activation solution can interfere with the coating of the tin coating alloy onto the surface of the copper base material. If the rinsing solution is water, the water is preferably maintained above about 80° F. and preferably be at least about 110° F. so as to exclude the dissolved oxygen from the water to prevent oxidation of the copper base material. Although the rinse process may also remove loosened oxides and/or debris from the copper base material. If the copper base material is immersed into the rinse liquid, the rinse liquid is preferably agitated to assist in cleaning the surface of the copper base material. The agitators, if used, preferably include moving brushes which preferably contact the copper base material. The rinse solution may be alternatively, or additionally, sprayed onto the surface of the copper base material to remove the pickling solution, chemical activation solution, oxides and/or debris.

In accordance with another aspect of the present invention, the tin alloy is applied to the copper base material by a process which forms a heat created intermetallic layer between the tin alloy and the copper base material. The heat created intermetallic layer is preferably formed by exposing the surface of the copper base material to the tin alloy in a molten or semi-molten state. The intermetallic layer is a metal layer which includes copper and tin. The intermetallic layer may include other metals such as one or more metal additive in the tin alloy, one or more metal additives in the copper base material, and/or the metal of the intermediate layer. The intermetallic layer is formed by heating the tin alloy on the copper base material and/or applying a heated or molten tin alloy to the copper base material. The heated and/or molten tin alloy heats the surface of the copper base material thereby causing a portion of the copper base material to soften and/or melt. The softened and/or molten copper base material combines with a portion of the heated and/or molten tin alloy to form the heat created intermetallic layer. If an intermediate metal layer is applied to the surface of the copper base material, the heated and/or molten tin alloy heats and/or melts the intermediate metal layer thereby causing the metal of the intermediate layer to combine with the metals of the tin alloy and copper base material. This combined layer of metals forms the heat created intermetallic layer. The heat created intermetallic layer is preferably a thin metal layer. Preferably, the heat created intermetallic layer is less than 100 microns thick, more preferably less than 50 microns thick, even more preferably less than 25 microns thick, and still even more preferably about 1 to 10 microns thick. The heat created intermetallic layer forms a corrosion resistant layer which protects the copper base material from corrosion when corrosives penetrate the tin alloy. The heat created intermetallic also forms a strong bond with the copper base material and the tin alloy to help reduce the amount of flaking of the tin alloy from the copper base material.

In accordance with yet another aspect of the present invention, the tin alloy is applied to the surface of the copper base material by a process which includes heat. Preferably the coating process includes hot dip coating, metal spraying, and/or flow heating. Preferably, the process heats the tin alloy until the tin alloy is at least softened, more preferably until at least a portion of the tin alloy is molten, and still more preferably until at least a majority of the tin alloy is molten. The process of plating and subsequent flow heating and the hot dip process are essentially equivalent process for the purpose of forming the heat created intermetallic layer.

In accordance with still yet another aspect of the present invention, the tin alloy is coated onto the surface of the copper base material by a plating process followed by a flow heating process. The tin alloy is preferably applied to the surface of the copper base material by a conventional electroplating process. The thickness of the tin alloy is preferably about 2 to about 30 microns. The copper base material can be plated by a batch or a continuous plating process. After the tin alloy is plated onto the copper base material, the tin alloy is flow heated. The tin alloy may be flow heated by use of a convection oven, induction heaters, flames, hot air or the like. The tin alloy is preferably heated until a substantial portion of tin coating alloy is molten. By causing the tin alloy to enter a molten state, a very uniform and level coated layer is formed. The flow heating of the tin alloy reduces and/or eliminates the number of pin holes in the tin alloy which may have formed during the plating process thereby improving the corrosion-resistance of the tin alloy. The causing of the tin alloy to enter into a molten state results in the formation of the heat created intermetallic layer. The tin coated copper base material is exposed to the flow heating process preferably less than an hour, and more preferably less than 10 minutes. The time period selected is for flow heating primarily based upon the time necessary to soften and/or melt the desired amount of the tin alloy and to obtain the desired thickness of the heat created intermetallic layer. The flow heating process can be a batch or continuous process. If a continuous process is used, the copper base material is passed through the plating process and the flow heating process at a speed of about 1 to 400 ft/min.

In accordance with another aspect of the present invention, the tin alloy is coated onto the surface of the copper base material by a hot dip process wherein the copper base material is dipped or passed through the molten tin alloy thereby coating the copper base material. The temperature of the molten tin alloy is maintained above its melting point to insure proper coating. Tin melts at about 232° C. (450° F.). Metals such as aluminum, antimony, arsenic, bismuth, cadmium, chromium, copper, iron, magnesium, manganese, nickel, titanium and /or zinc when added to the tin alloy alter the melting point of the tin alloy. In order to accommodate for high temperatures, the melting pot (coating tank) is made to withstand these higher temperatures such as increasing the thickness of the melting pot and/or using special high temperature melting materials for the construction of the melting pot. The temperature of the melting pot is preferably maintained several degrees above the melting point of the tin alloy so as to prevent the molten tin alloy from solidifying when the copper base material enters the melting pot. The residence time of the copper base material in the melting pot is selected to properly coat the copper base material and to form the heat created intermetallic layer. Preferably, the copper base material is maintained in the melting pot for at least about 5 seconds and less than about 2–10 minutes, and preferably less than about one minute. The copper base material is preferably coated by a continuous process. The copper base material is preferably passed through the molten tin alloy at a relatively constant speed which speed ranges from about 1–400 ft/min. The coating of the copper base material by a continuous hot dip process preferably includes the moving of a copper strip continuously through the molten tin alloy in a melting pot in a curvilinear path, thus requiring few, if any, guide rolls (driving rollers). The continuous coating process preferably allows the copper strip to dictate the path in the molten tin alloy. The coating thickness of the tin alloy onto the copper base material is a function of the time the copper base material is resident or immersed in the molten tin alloy. The coating thickness increases the longer the copper base material is maintained in the molten tin alloy. In a continuous hot dipping process, the resident time of the surfaces of the copper base material in the molten tin alloy is equal. The uniformity of residence time in the molten tin alloy results in uniform coating thicknesses on the surface of the copper base material and substantially uniform growth of the heat created intermetallic layer. The copper base material is preferably maintained at a constant speed through the molten tin alloy to create a smooth coated surface. As the copper base material passes through the molten tin alloy at a substantially constant speed, the molten tin alloy about the copper base material adheres to the moving copper base material and shears a portion of the coating from the moving copper base material. This shearing effect results from the viscosity of the molten tin alloy and the speed at which the copper base material is moving through the molten tin alloy. For a given speed and molten tin alloy viscosity, a constant shearing effect is applied to the surface of the moving copper base material thereby smoothing the coated surface and facilitating in the formation of a constant coating thickness. By using a continuous hot dipping process to coat the copper base material with a tin alloy, a uniform of coating (weight and thickness) is obtained, having excellent surface appearance, smoothness, texture control and a substantially uniform heat created intermetallic layer.

In accordance with another aspect of the present invention, when the copper base material is coated by a hop dip process, the use of a flux box is preferably used whereby the copper base material passes through the flux box prior to passing into the melting pot which contains the molten tin alloy. The flux box preferably contains a flux which has a lower specific gravity than the molten tin alloy, thus the flux floats on the surface of the molten tin alloy. The flux helps to remove residual oxides from the surface of the copper base material, assists in shielding the surface of the copper base material from oxygen until the copper base material is coated with the tin alloy, helps to inhibit the formation of viscous oxides at the point where the copper base material enters the molten tin alloy and helps to inhibit dross formation on the copper base material. The flux preferably includes a zinc chloride solution. The flux also preferably includes ammonium chloride. In one preferred formulation, the flux contains approximately about 30–60 weight percent zinc chloride and up to about 40 weight percent ammonium chloride, and preferably about 50% zinc chloride and about 8% ammonium chloride.

In accordance with yet another aspect of the present invention, the melting pot is preferably heated by heating coils, heating rods, gas jets, etc. Preferably, the melting pot is heated by at least one gas jet directed to at least one side of the melting pot. Heating coils and heating rods are preferably used to heat the tin alloy directly in the melting pot. Gas jets can be used as an alternative to heating rods to heat the molten tin alloy.

In accordance with another aspect of the present invention, a protective material is used on the surface of the molten tin alloy in the melting pot. The protective material preferably has a specific gravity which is less than the molten tin alloy so that the protective material floats on the surface of the molten tin alloy. The protective material shields the molten tin alloy from the atmosphere thereby preventing oxides from forming on the surface of the molten tin alloy. The protective material also inhibits dross formation on the coated copper base material as the coated copper base material exits the melting pot. One preferred protective material is palm oil.

In accordance with another aspect of the present invention, a copper base material which is coated with a tin alloy by a hot dip process is preferably subjected to an air-knife process. In an air-knife process, the coated copper base material is subjected to a high velocity gas. The high velocity gas strips surplus coated tin alloy from the copper base material, smears the coated tin alloy over the copper base material to cover any pin holes, reduces lumps or ribs in the coated tin alloy forming on the surface of the copper base material, reduces the coating thickness of the coated tin alloy and/or cools the coated tin alloy so as to set the tin alloy on the surface of the copper base material. The high velocity gas is preferably a gas which does not oxidize with the tin alloy. Preferably, the gas is an inert gas such as nitrogen, sulfur hexafluoride, carbon dioxide, hydrogen, noble gases and/or hydrocarbons. When an inert gas is used, the protective material on the surface of the tin alloy in the melting pot (i.e. palm oil) is preferably eliminated since the inert gas prevents dross formation, viscous oxide formation in the region in which the inert gas contacts the molten tin alloy in the melting pot. The high velocity inert gas also breaks up and pushes away any dross or viscous oxides from the surface of the molten tin alloy in the melting pot in the region the inert gas contacts the molten tin alloy thereby forming an essentially dross free—viscous oxide free region for the coated copper base material to be removed from the melting pot. The high velocity gas of the air-knife process is preferably directed onto both sides of the coated copper base material and at a direction which is preferably not perpendicular to the surface of the coated copper base material. As can be appreciated, the air knife process can also be used after the tin alloy has been flow heated. The air knife process can be used to smooth the coated tin alloy, close pin holes in the coated tin alloy and/or cool the tin alloy. The inert gasses used in the air knife process also help to reduce oxide formation on the tin alloy which can adversely affect the bolding of the tin alloy to and uniformity of the coating of the tin alloy on the surface of the copper base material. Furthermore, the air knife process can be used after the tin alloy is sprayed onto the surface of the copper base material. The use of the air knife process after a metal spraying process has similar advantages as those obtained by using the air knife process after flow heating or hot dip coating.

In accordance with still another aspect of the present invention, the thickness the tin alloy applied to the surface of the copper base material is regulated by one or more sets of coating rollers. The coating rollers form a smooth and uniform layer of tin alloy on the copper base material. The coating rollers are preferably used in conjunction with hot dip coating process, an air-knife process, a flow heating process, and/or a metal spraying process. When using a hot dip process to coat the copper base material, the coating rollers are preferably partially or totally immersed in the protective material, if any, on the surface of the molten tin alloy. The thickness of the coated tin alloy on each side of the copper base material from using the coating rollers is preferably at least about 1 micron and is preferably about 7 to 1250 microns and more preferably about 25 to 77 microns.

In accordance with yet another aspect of the present invention, a metal spraying process is used to coat the surface of the copper base material with a tin alloy. In this process, molten tin alloy is sprayed onto the surface of the copper base material to coat the surface of the copper base material. Spray jets are preferably used to spray the molten tin alloy onto the surface of the copper base metal. The metal spraying process can be the sole coating arrangement or can be used in conjunction with a hot dip process and/or plating and subsequent flow heating process. When the metal spraying process is used, the metal spray jets are preferably positioned adjacent to coating rollers to ensure complete coating of the copper base material. In one embodiment, the metal spray jets are positioned upstream from coating rollers and/or an air-knife process. In another embodiment, the metal spray jets apply the tin alloy coating as the copper base material passes through the coating rollers. The coating rollers both press against the copper base material and fill in any pin holes or uncoated surfaces on the copper base material and control the coating thickness of the tin alloy on the surface of the copper base material.

In accordance with another aspect of the present invention, the coated copper base metal is flow heated to form or ensure proper formation of the intermetallic layer, to minimize the number of pin holes or other discontinuities in the coating, and/or to smooth out or ensure a uniform coating on the surface of the copper base material. The flow heating process can occur after plating, hot dip coating, spray coating, and/or the air knife process.

In accordance with yet another aspect of the present invention, the coated copper base material is preferably cooled. The cooling of the coated copper base material is accomplished by spraying the coated copper base material with a cooling fluid and/or immersing the coated copper base material in a cooling liquid. The cooling of the coated copper base material usually is less than one hour and preferably is less than a few minutes. When the tin alloy is allowed to cool at different rates, different grain size and grain densities form. Slowly cooling the tin alloy coating results in a larger grain size, lower grain densities, and a highly reflective surface. Rapid cooling of the tin alloy coating results in a fine grain size, increased grain density and a less reflective surface. Small grain sizes and higher grain densities produce a stronger bond with the copper base material and result in greater corrosion resistance. For a liquid spray cooling process, a liquid such as water is preferably jet sprayed onto the coated copper base material. In such a cooling process, the coated copper base material is preferably guided through the liquid jet sprays. The guides for the coated copper base material can include a camel-back guide. The camel-back guide is designed such that only the edges of the coated copper base material contact the guide. By minimizing the contact of the coated copper base material with the guides, the amount of tin alloy inadvertently removed from the coated copper base material is reduced. The camel-back guide is also designed to allow the liquid jets to cool the underside of the coated copper base material. For an immersion process, the liquid such as water is preferably agitated to increase the cooling rate of the coating copper base material. The temperature of the cooling liquid is preferably maintained at desired cooling temperatures by heat exchanger and/or replenishing the liquid metal coating. If water is used as the cooling liquid, the cooling liquid can be used to discolor the coated tin alloy. The oxygen in the cooling water oxidizes with the tin alloy during cooling which results in a slightly discolored surface having reduced reflectability.

In accordance with still yet another aspect of the present invention, the coated copper base material is passed through a leveler, whereby the coated tin alloy is uniformly molded about the copper base material and controls the final coating thickness. The leveler preferably consists of a plurality of rollers. The coated copper base material is passed through the rollers to smooth out the tin alloy. The coated copper base material is preferably maintained at a tension as it is passed through the leveler.

In accordance with another aspect of the present invention, the coated copper base material is coiled into coils for later processing. Alternatively, the coated copper base metal is sheared after it has been cooled and/or leveled. For a continuously moving coated copper base material, the shearing device preferably travels next to and at the same speed as the coated copper base material to properly shear the moving coated copper base material.

In accordance with still another aspect of the present invention, the coated copper base material is processed in an oxidation solution to expose the heat created intermetallic layer which is formed during the coating process. The oxidation solution preferably includes an oxidizing acid. The oxidation solution reacts with the tin alloy to remove the tin alloy and thereby, expose the heat created intermetallic layer. The intermetallic layer, when exposed to the oxidation solution, preferably reacts with the oxidation solution to form a thin barrier layer that is highly resistant to corrosion, especially in a saline environment. In one preferred embodiment, the oxidation solution oxides the tin alloy and passifies the intermetallic layer to form a corrosion resistant layer. After the intermetallic layer reacts with the oxidation solution to form the thin barrier layer, the oxidation solution essentially ceases further reaction with the thin barrier layer. In another embodiment, the oxidizing solution removes the tin alloy and a second solution, i.e. passivation solution reacts with the intermetallic layer to form a corrosion resistant layer. The passivation solution is a nitrogen containing solution. The tin barrier layer formed on the surface of the intermetallic layer exhibits improved corrosion resistance as compared to a non-pacified intermetallic layer. The barrier layer also exhibits improved abrasion resistance and hardness as compared to a non-pacified intermetallic layer. The barrier layer is easily formable and resists cracking or damage when the treated copper base material is formed into various components. The barrier layer also has a greyish, non-reflective color that is desirable in many types of applications. The oxidation solution preferably includes nitric acid. The oxidation solution may also contain copper sulfate. The temperature of the oxidation solution is preferably between 20°–80° C. The time necessary for removing the tin alloy to expose the heat created intermetallic layer may be reduced by increasing the temperature of the oxidation solution and/or increasing the strength of the oxidation solution. The time to remove the tin alloy is usually less than two minutes. Once the heat created intermetallic layer is exposed, the pacified copper base material is rinsed off to remove any remaining oxidation solution.

In accordance with another aspect of the present invention, the coated copper base material is treated with a weathering agent if the coated copper base material is not subjected to the passivation solution. The weathering agent is formulated to accelerate the weathering and discoloration of the tin alloy. The weathering agent is applied to the tin alloy to oxidize the tin alloy and reduce the reflectivity of the tin alloy. The weathering agent is preferably an asphalt-based paint which causes accelerated weathering of the tin alloy when it is exposed to the atmosphere. The asphalt-based paint significantly decreases the weathering time of the tin alloy to less than a year. The asphalt paint is preferably a petroleum-based paint which includes asphalt, titanium oxide, inert silicates, clay, carbon black or other free carbon and an anti-settling agent. The asphalt-based paint is preferably applied at a relatively thin thickness so as to form a semi-transparent or translucent layer over the tin alloy. The thickness of the asphalt-based paint ranges between about 0.25 to 5 mils (0.00025–0.005 inch) and preferably is about 1–2 mils (0.001–0.002 inch). Once the translucent paint has been applied, the weathering agent is dried, preferably by air drying and/or heated by heating lamps.

In accordance with yet another feature of the present invention, the tin alloy composition is such that the coated copper base material can be formed on site without the tin alloy cracking and/or flaking off.

In accordance with another feature of the present invention, the tin alloy exhibits excellent soldering characteristics such that various electrodes including lead and no-lead electrodes can be used to weld the coated copper base material.

In accordance with still another feature of the present invention, the pacified intermetallic layer exhibits excellent formability characteristics. The formability of the copper base material having a pacified intermetallic layer on the surface of the copper base material exhibits improved formability characteristics over a tin coated copper base material. The improved formability is believed to be the result of the removal of the tin alloy from the surface of the copper base material. The removal of the tin alloy reduces the thickness of the treated copper base material. The tin alloy is also less formable than copper. As a result, the reducing of the thickness of the treated copper base material and by removing a less formable metal layer, i.e. the tin alloy, the copper base material having a pacified intermetallic layer exhibits better formability as compared to a tin coated copper base material.

The primary object of the present invention is the provision of a coated copper base material having corrosion resistant properties.

Another object of the present invention is the provision of a copper base material coated with a corrosion resistant tin alloy made of a majority of tin.

Yet another object of the present invention is the provision of applying a thin metal intermediate barrier to the surface of the copper base material prior to applying the tin alloy to the copper base material.

Another object of the present invention is the provision of a tin alloy which has a low lead content.

Yet another object of the present invention is the provision of coating a copper base material by a continuous process.

Still yet another object of the present invention is to provide a coated copper base material which is formed and sheared to form various building and roofing components, gasoline tanks, and other formed materials that are subsequently assembled on site or in a forming facility.

Another object of the present invention is the provision of a coated copper base material that is corrosion-resistant and which can be easily formed into complex shapes and/or ornamental designs.

Still yet another object of the present invention is the addition of a metal additive to the tin alloy to improve the corrosion-resistance of the tin alloy.

Yet another object of the present invention is the addition of a metal additive to the tin alloy to improve the mechanical properties of the tin alloy.

Another object of the present invention is the addition of a metal additive to the tin alloy to positively affect grain refinement of the tin alloy.

Yet another object of the present invention is the addition of a metal additive to the tin alloy to reduce oxidation of the molten tin alloy.

Still yet another object of the present invention is the addition of a metal additive to the tin alloy to inhibit the crystallization of the tin in the tin alloy.

Yet another object of the present invention is the addition of a metal additive to the tin alloy to improve the bonding characteristics of the tin alloy.

Another object of the invention is to provide a tin alloy that is soldered with conventional tin-lead solders or no-lead solders.

Still yet another object of the present invention is the provision of using spray jets to spray molten tin alloy onto the surface of the copper base material to coat the surface of the copper base material.

Another object of the present invention is the provision of coating the coated copper base material with a weathering agent to accelerate the dulling of the surface of the tin alloy.

Still another object of the present invention is the use of an air-knife process to control the thickness and quality of the tin alloy coating on the copper base material.

Yet another object of the present invention is the formation of a heat created intermetallic layer between the copper base material and the tin alloy, which intermetallic layer forms a strong bond between the copper base material and the tin alloy.

Another object of the present invention is the provision of pickling a copper base material to remove surface oxides on the copper base material prior to coating the copper base material with a tin alloy.

Yet another object of the present invention is the provision of chemically activating a copper base material to remove surface oxides on the copper base material prior to coating the copper base material and the tin alloy.

Still yet another object of the present invention is the provision of reducing the oxygen interaction with the copper base material prior to and during the coating process.

Yet still another object of the present invention is the provision of cooling the tin alloy coating to form fine, high density grains which produce a strong bonding, corrosive-resistant, discolored coating.

Another object of the present invention is the provision of abrasively treating the surface of the copper base material prior to coating the copper base material.

Another object of the present invention is the provision of subjecting the coated copper base material to an oxidation solution to remove the tin alloy from the copper base material and to expose the heat created intermetallic layer.

Another object of the present invention is the provision of subjecting the heat created intermetallic layer to a passivation solution to form a highly corrosion-resistant, non-reflective surface layer on the copper base material.

Still a further object of the present invention is the provision of producing a highly corrosion-resistant coated copper base material that is economical to make.

These and other objects and advantages will become apparent to those skilled in the art upon reading of the detailed description of the invention set forth below.

BRIEF DESCRIPTION OF THE DRAWINGS

FIGS. 1A–1B are a cross-sectional view of the process of hot-dip tin alloy coating of a copper base material as defined in the present invention;

FIG. 2 is a cross-section view of additional and/or alternative processes for handling the coated copper base material;

FIG. 3 is a cross-sectional view of the process of plating a copper base material with a tin alloy;

FIG. 4 is a cross-sectional view of the process of flow heating a coated copper base material;

FIG. 5 illustrates a cross-section view of an alternative process of cooling the tin coated copper base material of the present invention;

FIG. 6 illustrates a cross-sectional view of an alternative embodiment wherein metal spray jets are used during the hot-dip coating of the copper base material;

FIG. 7 illustrates a cross-sectional view of an alternative embodiment wherein an air-knife process is used during the hot-dip coating of the copper base material;

FIG. 8 is a schematic side view illustrating a preferred embodiment for cooling the coated copper base material by using liquid spray jets;

DESCRIPTION OF THE PREFERRED EMBODIMENT

Figure 9:
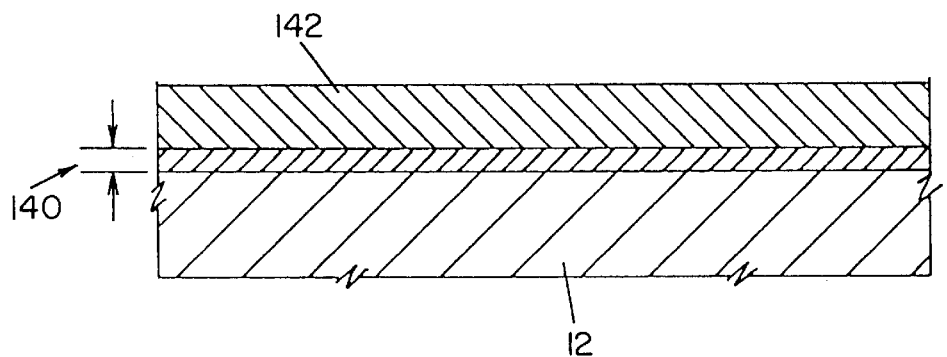
FIG. 9 is a cross-sectional view of a coated copper base material which illustrates the heat created intermetallic layer between the copper base material and the tin alloy.

Referring now to the drawings, wherein the showings are for the purpose of illustrating preferred embodiments of the invention only and not for the purpose of limiting the same, reference is first had to FIGS. 1A–1B which illustrate the process for hot-dip coating a tin alloy on a copper base material.

The tin alloy is a corrosion resistant alloy that prevents the copper base material from corroding when exposed to the atmosphere. The tin alloy contains a large weight percentage of tin. The tin alloy is corrosion resistant, abrasive resistant, pliable, weldable and environmentally friendly. The tin alloy binds with the copper base material to form a durable protective coating.

The invention will now be described with particular reference to a copper base material in the form of a copper metal strip; however, the invention is understood to have much broader application and the tin alloy can be applied to wide variety of shaped and sized copper base materials. The invention will also now be described with particular reference to a hot dip process and to a plating process with subsequent flow heating process; however, the tin alloy may be applied by a variety of coating processes such as by metal spraying; hot dip coating and subsequent metal spaying, air-knifing and/or flow heating; plating and subsequent flow heating, metal spraying, and/or air-knifing; etc.

Metal strip primarily made of copper or copper alloy has very desirable mechanical properties and natural corrosive resistant properties. Copper is one of the strongest pure metals. It is moderately hard, extremely tough, and wear resistant. Though copper in its commercially pure state is very formable thus relatively easily shaped, the copper can be further softened by an annealing process to further improve its formability. Copper alloys can be used in a wide variety of applications. The thickness of the copper strip can be varied depending on the particular application. Generally, copper strip used in the continuous coating process has a thickness comparable to stainless 304 and stainless 316.

Commercial copper naturally resists corrosion in typical atmospheric conditions. When copper is exposed to oxygen and carbon dioxides, the surface reacts to form a black and/or green film. This film acts as a natural protective coating against the further reduction of the copper.

The life of the copper can be significantly extended by coating the copper with a tin alloy. Copper slowly oxidizes when exposed to the atmosphere. Over a period of time, the oxidized copper will begin to weaken and disintegrate. By coating the copper with a tin alloy, such coating alloy acts as a barrier to the atmosphere which prevents the copper from reducing in the presence of oxygen or carbon dioxide. In addition to the corrosion-resistant properties of the tin alloy, the coating alloy must be pliable to not adversely affect the pliability of the coated copper strip. The pliability of the coated copper strip is important to allow the coated copper strip to be formed into various shapes. A coating that forms a rigid or brittle coating on the copper strip may crack and/or may prevent the coated copper strip from being properly shaped. The tin alloy of the present invention is pliable enough such that when it is coated on the copper strip, the coated strip can still be formed into a variety of shapes. The tin alloy of the present invention contains low levels of lead, produces a highly corrosive resistant metallic coating, has relatively high pliability and can be soldered to other materials.

As illustrated in FIGS. 1A–1B, strip 12 is a copper strip provided from a large roll 10. The thickness of strip 12 is about 0.005–0.2 inch. Preferably, strip 12 is less than about 0.05 inch and is about 0.015 inch. Strip 12 is unwound from roll 10 at speeds which are preferably less than about 400 ft./min. and preferably between about 70 to 250 ft./min. The strip speed is ultimately selected so that the residence time of the strip in melting pot 70 is less than about 10 minutes, and preferably less than about one minute. Strip guides 13 are positioned throughout the coating process to properly guide strip 12 through each treatment process.

After metal strip 12 is unrolled from roll 10, strip 12 is pretreated as to activate, i.e. remove oxides, the strip surface. Abrasion treater 14, in the form of wire brushes 16, is driven by motors. The wire brushes are placed in contact with strip 12 to remove foreign objects from strip 12 and to initially etch and/or mechanically remove oxides from the surface of strip 12. Abrasion treater 14 may take any form but is preferably biased against strip 12 to provide the necessary friction between the brushes 16 and strip 12 for proper cleaning of strip 12. Preferably, there is an abrasion treater 14 located on the top and bottom surface of strip 12 so that proper treatment of strip 12 is achieved. Abrasion brush 16 is preferably made of a material having a hardness greater than strip 12 so that abrasion brush 16 will not quickly wear down and will properly remove foreign materials and/or pre-etch strip 12. Abrasion brush 16 preferably rotates in an opposite direction relative to moving strip 12 to provide additional abrasion to the strip 12. Strip 12 is preferably cleaned with cleaners or solvents such as alkaline cleaners or organic solvents to further remove debris. Abrasion treater 14 and/or the cleaning treatment is an optional process treatment and is used based on the condition of strip 12.

Once strip 12 passes through abrasion treater 14, if needed, strip 12 enters a low oxygen gas environment 20. Low oxygen gas environment 20 is formed by surrounding the strip 12 with low oxygen-containing gas 22. Such gases include nitrogen, hydrocarbons, hydrogen, noble gases and/or other non-oxygen containing gases. Preferably, the low oxygen-containing gas 22 is nitrogen gas. The nitrogen gas surrounding the strip 12 acts as a barrier against oxygen and carbon dioxide in the atmosphere and prevents the oxygen and carbon dioxide from forming oxides on strip 12. The low oxygen environment is an optional process.

Strip 12, after leaving low oxygen gas environment 20, if needed, enters into pickling tank 30. Pickling tank 30 is about 25 feet in length and of sufficient depth to completely immerse strip 12 in pickling solution 32. The pickling tank can be longer or shorter depending on the speed of the moving metal strip. The pickling tank 30 includes a pickling solution 32. The pickling solution contains one or more acids such as hydrofluoric acid, sulfuric acid, nitric acid, hydrochloric acid, phosphoric acid and/or isobromic acid. Pickling solution 32 preferably is a hydrochloric acid solution. The hydrochloric acid solution includes at least about 5% hydrochloric acid. The hydrochloric acid concentration within aggressive pickling solution 32 is about 1–25% hydrochloric acid and more preferably about 5–15% hydrochloric acid. Pickling solution 32 is maintained at a temperature of at least about 80° F., and preferably about 120–140° F. so that pickling solution 32 is maintained in a relatively reactive state to properly remove oxides from the surface of strip 12. Pickling solution 32 also causes minor etching of the surface of strip 12, which etching removes a very small surface layer of strip 12. Pickling tank 30 contains at least one agitator 34. Agitator 34 is provided to agitate pickling solution 32 to maintain a uniform solution concentration, maintain a uniform solution temperature and break up any gas pockets which forms on strip 12. Agitator 34 preferably includes an abrasive material which both agitates the pickling solution 32 and facilitates in the removal of oxides from strip 12. Agitator 34 is preferably made of a material which does not react with pickling solution 32. Agitator 34 is preferably positioned to directly contact the moving strip 12 to enhance oxide removal. The metal strip is preferably not in the pickling solution for more than about 5 minutes so as to avoid pitting of the strip. Preferably, the pickling time is less than about two minutes and more preferably between about 5 to 60 seconds. A pickling solution vent 36 is preferably placed above pickling tank 30 to collect and remove acid fumes and other gasses escaping from pickling tank 30. The pickling of strip 12 is an optional process and depends on the condition of the surface of strip 12.

Strip 12, after leaving pickling tank 30, if needed, enters into a low oxygen gas environment 20. After strip 12 exits pickling tank 30, strip 12 is essentially absent of any surface oxides and is susceptible to oxidation with oxygen and carbon dioxide in the atmosphere. Low oxygen gas environment 20 shields the surface of strip 12 from atmospheric oxygen and carbon dioxide and prevents any oxides from forming. Low oxygen environment 20 is preferably a low oxygen gas environment similar to the one previously discussed. The low oxygen environment is an optional process.

If strip 12 is passed through pickling solution 32 in pickling tank 30, the pickling solution 32 is preferably removed from water. The water in rinse tank 40. Rinse 40 contains a rinse solution 42 which is preferably heated water. The water in rinse tank 40 is deoxygenated by heating the water to above about 100° F. and preferably about 110° F. As can be appreciated other rinse liquids can be used to remove the pickling solution and protect the surface of the strip from oxidation. Due to the slightly acidic nature of rinse solution 42, rinse solution 42 further removes small amounts of oxides which exist on the surface of strip 12. Rinse tank 40 is about 20 feet in length but can be longer or shorter depending on the rate of speed at which strip 12 is traveling. Rinse solution 42 is preferably agitated so as to facilitate the removal of pickling solution 32 from strip 12 and to enhance removal of oxides from the surface of the strip. The agitators are preferably positioned in rinse tank 40 so as to be in contact with moving strip 12 to enhance the removal of pickling solution from strip 12. As can be appreciated, the pickling solution can be alternatively removed by spraying a rinse liquid onto the surface of strip 12.

Referring now to FIG. 1B, strip 12 enters low oxygen liquid environment 50 after exiting rinse tank 40. Low oxygen liquid environment 50 preferably includes at least two spray jets 52, one located on each side of strip 12. Spray jets 52 inject a low oxygen-containing liquid 56 on the surface of strip 12 to prevent oxygen and carbon dioxide from reacting with the surface of strip 12. Spray jets 52 also remove any additional pickling solution 32 which may be left on strip 12 after exiting rinse tank 40. Low oxygen-containing liquid 56 preferably is heated water having a temperature of about 110° F. The low oxygen environment is an optional process, especially when strip is not pickled and rinsed.

Strip 12 upon leaving low oxygen liquid environment 50, if used, enters chemical activating tank 60. Chemical activating tank 60 contains a chemical activating solution 62. Chemical activating solution 62 is formulated to further removes any oxides remaining on the surface of strip 12. Preferably, chemical activating solution 62 includes a zinc chloride solution. The chemical activating solution is maintained at a temperature at least 60° F. The chemical activating solution in chemical activating tank 60 not only removes lingering oxides on strip 12, but the chemical activating solution acts as a protective temporary coating which prevents oxide formation on strip 12 until strip 12 is coated. The temperature of the chemical activating solution is preferably kept at a temperature of about 60–90° F. and is agitated to maintain a uniform solution concentration. Small amounts of hydrochloric acid can be added to the chemical activating solution to further enhance oxide removal. Preferably, the chemical activating solution contains at least about 1% zinc chloride. The chemical activating solution preferably includes about 1–50% zinc chloride and about 0.5–15% hydrochloric acid. The chemical activation process is an optional process. The strip can be treated with the chemical activation process as a substitute for the pickling and rinse process, and/or the abrasion process.

The process steps of abrasion, pickling and rinsing, chemical activation and/or exposure to low oxygen environment are all optional process steps. The need for one or more of these process steps depends on the condition of the copper strip 12. If the surface of copper strip 12 is clean and essentially oxide free, all these process steps may be skipped. On the other extreme, if the surface of the copper strip is dirty and heavy oxidized, one or more of the process steps is preferably used to clean the surface of strip 12 prior to further processing of the strip.

Once the surface of strip 12 is acceptably clean and oxide free, strip 12 can be coated with an intermediate metal layer. However, the plating of the surface strip 12 can be used as a substitute or in addition to for the abrasion process, pickling and rinsing process and/or chemical activation process. The application of the intermediate metal layer is an optional process. The intermediate metal layer is preferably a single phase metal of tin, nickel, chromium or copper. The thickness of the layer is maintained such that it is of not more than about 3 microns and preferably has a thickness of about 1–3 microns. The process for plating the intermediate layer onto the surface of strip 12 is by a conventional plating process. The applied intermediate metal layer forms a strong bond with the surface of strip 12. The intermediate metal layer is preferably applied by an electroplating process, not shown. Metal strip 12 is preferably continuously passed through an electrolytic tank which contains an electrolyte solution. The plating of the intermediate metal layer is performed by standard electroplating techniques. Further details of the electroplating process will not be discussed. The plated intermediate layer may be flow heated or preheated prior to applying the coating of tin alloy. Flowing heating the intermediate forms a strong bond with the surface of the strip, forms a more uniform layer on the strip surface, and/or reduces the number of pin holes in the plated layer. As can be appreciated, the intermediate layer can be alternatively applied by a hot dip process and/or by a metal spraying process. The application of an intermediate metal layer to the surface of the strip is an optional process. If an intermediate metal layer is applied to the strip surface, the metal selected will be incorporated into the heat created intermetallic layer. Therefore, the composition of the intermetallic layer can be modified by the selection of metal of the intermediate layer.

After strip 12 is unrolled from roll 10, and if necessary or desired strip 12 is pretreated and/or coated with an intermediate metal layer, strip 12 preferably enters flux box 72 located in melting pot 70. As shown in FIG. 1B, flux box 72 contains a flux 74 having a specific gravity less than that of tin alloy 76. Flux 74 preferably includes zinc chloride and ammonia chloride. Preferably, flux 74 contains about 50% zinc chloride and about 8% ammonia chloride. Flux 74 is preferably the final pre-treating process of strip 12 for removal of any remaining oxides on the surface of strip 12 prior to being coated by a hot dip process. Flux 74 acts as a barrier to oxygen and prevents oxides from forming on the surface of the tin alloy, which oxides interfere with proper coating of the metal strip. As can be appreciated, the flux box is typically not used if the strip is coated with the tin alloy by a process other than the hot dip process In another embodiment of the present invention, strip 12 is preheated prior to being coating with the tin alloy. It has been found that a strip of a thickness of less than about 0.03 inch need not be pre-heated to coat the metal strip and to form the desired intermetallic layer. A thin metal strip need not be preheated since the thin strip quickly heats to the temperature of the molten tin alloy. As the strip reaches equilibrium with the temperature of the molten tin alloy, an intermetallic layer forms between the strip and the tin alloy. Metal strip up to about 0.03 inch thick is classified as thin metal strip and need not be preheated prior to coating. The absence of a the coating step simplifies the coating process and can also make the production of the coated strip more economical to manufacture. However, thin metal strip can be preheated and such preheated strip forms an intermetallic layer quicker than a non pre-heated strip. Metal strip having a thickness over about 0.03 inch is considered a thick metal strip and is preferably preheated prior to coating. Thick metal strip does not always reach the proper equilibrium of temperature to form a desired intermetallic layer. Preheating the thick metal strip facilitates in the metal strip reaching or approaching temperature equilibrium so that a desirable intermetallic layer is formed. Strip 12 can be heated in any number of ways. One preferable way of pre-heating the strip is by convection or induction heaters, not shown.

Upon leaving flux box 72, strip 12 enters molten tin alloy 76. Melting pot 70 is maintained at a temperature of several degrees above the melting point of tin alloy 76 so as to prevent solidification of tin alloy 76 as strip 12 enters melting pot 70. Molten tin alloy 76 is preferably maintained at a temperature of at least about 10° F. above the melting point of tin alloy 76. Melting pot 70 is preferably about 10–100 ft. in length so as to provide an adequate residence time of strip 12 as it is passing through melting pot 70. Longer melting pot lengths can be used for very fast moving strip. Melting pot 70 is preferably divided into two chambers by barrier 80 so as to prevent protective material 78, such as palm oil, from spreading over the total surface of molten tin coating alloy 76 in melting pot 70. As can be appreciated, barrier 80 can be eliminated from melting pot 70.

Molten tin alloy 76 is a tin alloy. The tin alloy is primarily made up of tin. A metal additive may be added to the tin alloy. Preferably, the tin alloy includes at least 75% tin, more preferably at least 90% tin, even more preferably at least 95% tin, and still even more preferably at least 99% tin.

As illustrated in FIG. 1B, as strip 12 passes through melting pot 70, an intermetallic layer 140 is formed as shown in FIG. 9. The intermetallic layer 140 is formed by the tin alloy atoms molecularly intertwining with atoms on the surface of strip 12 as the temperature of strip 12 approaches the temperature of the molten tin alloy. The migration of the tin alloy atoms into the surface of strip 12 results in the formation of intermetallic layer 140. The thickness of the intermetallic layer is very thin and varies between about 1–10 microns. Intermetallic layer 140 is a molecular level alloy primarily of copper and tin, i.e. Cu-Sn. Intermetallic layer 140 can include nickel, zinc, iron, copper, chromium, tin, aluminum, lead, manganese, silicon, cadmium, titanium, silver, arsenic, sulfur, tellurium, magnesium, antimony, bismuth, hydrogen, nitrogen and/or oxygen and small amounts of other elements or compounds depending on the composition of strip 12 and tin alloy 76. Intermetallic layer 140 can be thought of as a transition layer between strip 12 and tin alloy coating 142. Intermetallic layer 140 forms a strong bond between tin alloy coating 142 and strip 12. The intermetallic layer also forms a corrosive-resistant layer. The residence time of strip 12 in melting pot 70 is preferably less than three minutes, preferably less than one minute, and more preferably about 5–30 seconds. The residence time is selected to properly form intermetallic layer 140.

Melting pot 70 can be heated by heating jets, coils, rods, heat exchanger, etc. Preferably, melting pot 70 is heated by four heating jets, not shown, directed at the outside sides of melting pot 70. The heating jets are preferably gas jets which heat molten tin alloy 76 in melting pot 70 to at least the temperature needed to melt the tin alloy. The temperature of the melting pot is preferably about 449–1000° F. and will depend on the composition of the tin alloy. Higher temperatures may be needed for different tin alloys, thus, additional heating jets, heating rods and/or heating coils can be used to heat melting pot 70. As discussed above, strip 12 is preferably not preheated as the strip enters melting pot 70, thus melting pot 70 is maintained at least several degrees above the melting point of tin alloy 76 to prevent the molten tin alloy from solidifying as the strip enters the molten tin alloy.

Referring now to FIGS. 1B, strip 12 preferably passes between at least one set of coating rollers 82 prior to exiting melting pot 70. Coating rollers 82 maintain the desired coating thickness on strip 12 and remove any excess tin alloy 76 from strip 12. The thickness of tin alloy coating on strip 12 is preferably maintained between about 0.0001 to about 0.05 inch, more preferably above about 0.0003 inch, and more preferably about 0.001 to about 0.003 inch (0.1–1.8 oz/ft$^2$ @ density of 447 lb/ft$^3$). A coating thickness of at least about 0.0003 inch forms a uniform coating and resists tearing when the coating strip is drawn or formed. Such coating thicknesses essentially eliminates uncovered and unprotected areas on the strip surface commonly found on coated articles with thinner coatings. The coating thickness of at least about 0.0003 inch also allows for greater elongation characteristics of the coated strip as compared to strip having a thinner coating. The coating thickness is selected to ensure that the metal alloy coating has essentially no pin holes, and does not shear when formed into products such as roofing materials, building materials gasoline tanks, filter casings and/or various other products formed from coated strip 12. When coating rollers are used, protective material 78 is preferably located near coating rollers 82. The protective material floats on top of molten tin alloy 76 to prevent the molten tin alloy from solidifying and oxidizing, reduces dross formation and also aids in properly distribution the tin alloy on strip 12.

In another alternative embodiment, FIG. 6 illustrates a metal coating jet 84 which injects molten tin alloy 76 on the outer surface of coating rollers 82. Molten tin alloy 76 is spray jetted on coating rollers 82 and is pressed against strip 12 as strip 12 travels between coating rollers 82 to fill in any small surface areas on strip 12 which have not been coated by the molten tin alloy. Preferably two coating jets are used. The spray metal process can be used in conjunction with a hot dip process as shown in FIG. 6, can be used in conjunction with a plating process, not shown, and/or can be the sole process for coating the strip, not shown.

In still another alternative embodiment, FIG. 7 illustrates an air-knife process wherein an air-knife 100 which directs a high velocity gas toward tin alloy coating 76 on strip 12. Two or more blast nozzles 104, which are mutually opposed from each other and disposed over melting pot 70, direct high velocity gas 105 toward coated strip 12 and down into melting pot 70 as the strip travels between the blast nozzles. The high velocity gas removes surplus molten tin alloy from the strip, smears the molten tin alloy on strip 12 to cover any pin holes, reduces the thickness of the tin alloy coating on the strip and/or reduce lumps or ribs in the tin alloy coating. The high velocity gas is preferably an inert gas so as not to induce oxidation of the molten tin alloy. Use of an inert gas also reduces dross formation on the tin alloy coating and acts as a protective barrier to air which causes viscous oxides to form on the surface of the molten tin alloy in melting pot 70. When inert gas is used, the use of a protective material on the melting pot is not required. Preferably the inert gas is nitrogen or an inert gas heavier (higher density) than air. The blast nozzles are preferably adjustable to direct the high velocity gas at various angles to the surface of the coated tin alloy to vary the amount of coating shaved off the strip. Though not shown, the blast nozzles are preferably enclosed in a box shaped sleeve which contains the inert gas after the gas contacts the strip and recirculates the inert gas back through the blast nozzles. When an air-knife process is used, the air-knife is preferably used as a substitute for or in conjunction with coating rollers 82. The air-knife process can be used in conjunction with a hot dip process as shown in FIG. 7, can be used in conjunction with a spray jet process, not shown, and/or can be used in conjunction with a flow heating process, not shown.

In an alternative embodiment illustrated in FIGS. 3 and 4, strip 12 is coated with tin alloy 76 by a plating process followed by flow heating process. As shown in FIG. 3, strip 12 is moved into electrolytic tank 44 and submerged in electrolyte 46. An electrical current is generated by electrodes 48 supplied by power source 49 in electrolyte 46 to effect the plating process. The tin alloy is then plated onto the surface of strip 12. After the strip is plated, the strip is moved out of electrolytic tank 44. Plated strip 12 is then heated until the tin alloy softens and/or becomes molten and an intermetallic layer forms. As shown in FIG. 4, heaters 58 are positioned on each side of strip 12 to simultaneously flow heat the plated tin alloy. As can be appreciated, one side of the strip at a time can be flow heated. After the strip is flow heated, the coated strip can be subjected to an air-knife process; recoated by a spray metal process and/or a hot dip process; and/or plated and flow heated multiple times. The thickness of the tin alloy is varied depending on the environment in which the coated copper strip is to be used. The tin alloy exhibits superior corrosive resistant properties in rural environments, industrial and marine environments. The tin metal alloy coating is preferably applied in a thickness between 0.0001–0.05 inch. Preferably, the tin metal alloy coating thickness is at least 0.0003 inch and more preferably 0.001–0.002 inch. Such a tin metal alloy coating thickness has been found to be adequate to prevent and/or significantly reduce the corrosion of the copper strip in virtually all types of environments. Tin alloy coating having thicknesses greater than 0.002 can be used in harsh environments to provide added corrosion protection.

Referring now to FIG. 1B, after strip 12 is coated with the tin alloy, the coat strip is cooled by a cooling liquid such as water. At least one cool liquid spray jet 92 is used to cool coated strip 12. The cooling liquid 93 is preferable is preferably maintained at ambient temperatures, but may be cooler or warmer in temperature. The velocity of the cooling liquid in spray jet 92 is increased or decreased to vary the desired cooling rate of the tin alloy coating.

In an alternative embodiment, as illustrated in FIG. 5, strip 12 is cooled in a cooling tank 94 wherein strip 12 is immersed in a cooling liquid such as cooling water. Cooling liquid 96 in cooling tank 94 is preferably maintained at ambient temperatures and is preferably agitated to increase the rate of cooling of the tin coating. The water in cooling tank 94 is preferably recirculated to maintain the desire it temperature of the cooling liquid.

Rapid cooling of the tin alloy coating by either cooling tank 94 or cool liquid jet spray 92 is preferable so as to produce a tin alloy coating having fine grain size with increased grain density. The cooling time period is preferably less than about two minutes and more preferably about 10–30 seconds. As illustrated in FIG. 1B, once the strip has been cooled, the strip can be wound on strip roll 150 to be later processed and/or formed. However, cooled coated strip 12 can be further processed prior to rolling, cutting or forming.

In an alternative embodiment, strip 12 is subjected to leveler 100 prior to being rolled, cut, or otherwise further processed. As illustrated in FIG. 2, leveler 100 includes several level rollers 102 which produce a uniform and smooth tin alloy coating 142 on strip 12. After strip 12 exits leveler 100, strip 12 may be cut by shear 111 into the desired strip lengths, rolled in strip roll 15 C, or further processed prior to cutting, rolling or forming.

Figure 10:
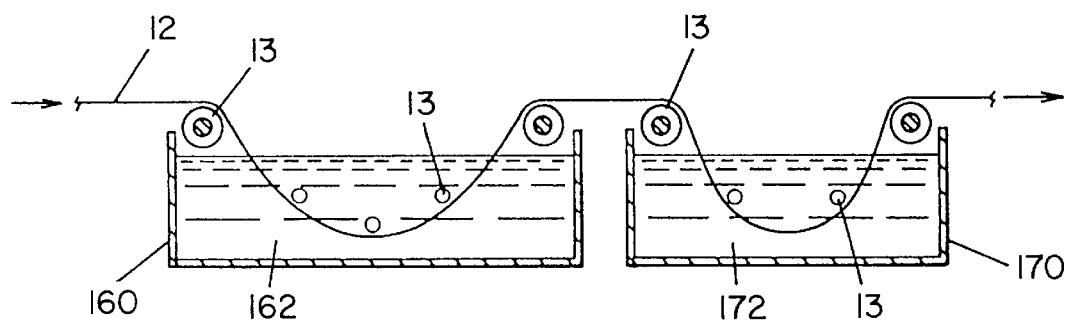
FIG. 10 illustrates a cross-section view of the process of oxidizing the coated strip to expose the intermetallic layer.
Figure 11:
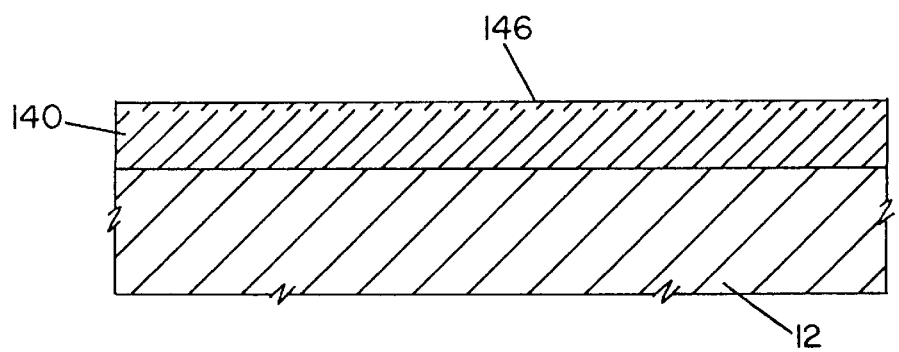
FIG. 11 is a cross-sectional view of a pacified coated copper base material.

In a preferred embodiment, after the coated strip is cooled, the tin alloy is removed from strip 12 to expose intermetallic layer 140. As shown in FIG. 10, the coated strip enters into oxidizing tank 160 which contains an oxidizing solution 162. The oxidizing solution removes the tin alloy coating 142 from strip 12 by oxidizing the tin alloy to expose intermetallic layer 140, as shown in FIG. 11. The intermetallic layer 140 has been found to be superior in protecting against corrosion. The oxidation solution also colors intermetallic layer 140 by pacifying the intermetallic layer 140 to form pacified layer 146. The oxidation solution is preferably a solution of nitric acid. The nitric acid concentration is about 5%–60% and is preferably about 10–25%. By increasing the concentration of the nitric acid, the time needed to remove tin alloy coating 146 is shortened. The removal of the tin alloy coating is generally less than about two minutes. Copper sulfate is preferably added to the oxidizing solution to further increase the rate of removal of the tin alloy coating. Copper sulfate, when present, is added at a concentration of less than about 10% and preferably about 0.5–2% of the oxidizing solution. The temperature of the oxidizing solution is maintained at a temperature that provides sufficient activity. The temperature is preferably maintained between about 30–80° C. and more preferably about 40–60° C. By increasing the temperature of the oxidizing solution, the activity of the oxidizing solution increases thereby shortening the time needed to remove the tin alloy coating 142 from strip 12. The oxidizing tank 160 preferably includes an agitator to prevent stagnation and/or vast concentration differences of the oxidizing solution in the tank and to prevent gas bubbles from forming on the surface of strip 12. Once the tin alloy coating is removed, the exposed intermetallic layer is passivated. The intermetallic layer 142 is passivated by a solution which preferably includes a nitrogen containing solution. Nitric acid is one type of solution. When nitric acid is used, the tin alloy coating removal and intermetallic layer passivation is accomplished in a single oxidizing tank. However, if the oxidizing solution and passifying solution are different, separate tanks for each process is used. When nitric acid is used as the oxidation solution, once the intermetallic layer is passivated, the passivated layer 146 is not removed by the oxidation passivation solution, thus making the tin alloy coating removal and intermetallic layer passivation autocatalytic. The passivated surface layer 146 significantly enhances the corrosion-resistance of the intermetallic layer 142. Although it is not entirely known how passivated layer 148 exhibits increased corrosion resistance, it is believed that a unique covalently bonded system is formed when the intermetallic layer is pacified. Intermetallic layer 142 is believed to be made of primarily copper and tin. When the intermetallic layer 142 is pacified with passivation solution 162, a chemical reaction is believed to occur to modify the atomic structure of passivated later 146. Other elements such as nitrogen, hydrogen, oxygen may also be present in passivated layer 146 to enhance the stability of layer 146. Passivated layer 146 is less than about 1.5 microns in thickness. During the passivation and/or rinse procedure, the intermetallic layer 142 is believed to oxidize with the available surrounding oxygen to form the corrosion resistant layer 146. The special formulation of the intermetallic layer 142 in combination with the passivated layer 146 provides for superior corrosion resistance for strip 12. Passivated layer 146 is also malleable and will not crack when formed into various shapes. Passivated layer 146 is grey, non-reflective surface. Passivated layer 146 displays increased corrosion resistance, abrasion resistance, and increased hardness as compared to the intermetallic layer. The relative nonexistence of lead from intermetallic layer 142 and passivated layer makes the corrosion resistant strip a superior substitute to terne coated materials. Not only is the corrosion resistance of intermetallic layer 142 and passivated layer 146 greater than terne coatings, intermetallic layer 142 and passivated layer 146 contains no lead or essentially no lead thereby alleviating any concerns associated with the use of lead materials. Intermetallic layer 142 and passivated layer 146 are also resistant to scratching thereby improving the visual quality of strip 12 and enhancing the damage resistance of strip 12.

After strip 12 passes through the oxidizing tank 160, strip 12 proceeds into an oxidizing rinse tank 170 as shown in FIG. 10. The oxidizing rinse tank contains a liquid 172 which removes any remaining passivation solution from strip 12. Preferably, the liquid is water at ambient temperature. The oxidizing rinse tank preferably includes an agitator to further assist in the removal of the passivation solution from strip 12. Strip 12 alternatively is rinsed off by spray jets instead of in a rinse tank. Once the rinse process is complete, the strip is rolled into strip roll 150, cut into sheets 130, or preformed into various articles. Alternatively, the oxidizing solution can be applied subsequent to the preforming of the strip or sheets. For example, when roof materials are preformed from the coated strip or coated sheets, the roofing materials can be completely installed and soldered together and the passivation solution can then be sprayed or swabbed onto the roofing materials to expose and pacify the intermetallic layer.

In an alternative embodiment, coated strip 12 is coated with a pre-weather agent 112 instead of being subjected to a passivation solution, as illustrated in FIG. 2. The tin alloy coated strip 12 or cut sheets 130 are pre-weather coated by pre-weather caters 114 which apply a pre-weather agent 112. Pre-weather agent 112 includes an asphalt-base paint which is applied at a thickness of approximately 1–2 mils. Preferably, coated sheet 130 or tin coated strip 12 are coated with a pre-weather agent 112 on both sides of the sheet or strip. The preweather coaters 114 apply pre-weather agent 112 in pre-weather agent reservoir 110 by pre-weather sprayer 116 and/or by rotating coaters 114. The pre-weather-weather agent 112 is dried by heat lamp 120 and/or by a dryer 122. The coated strip 12 or cut sheet 130 is rolled in strip roll 150, stacked in sheets for transport, or pre-formed into roofing materials, building materials, gas tanks, filters, etc.

In accordance with another embodiment of the present invention, the tin alloy contains small amounts of other metals to modify the mechanical properties of the tin alloy to contribute to the strength of the metal alloy, to the corrosion-resistance of the tin alloy, to the color of the tin alloy, to the stability of the tin alloy and/or to the coating properties of the tin alloy. The secondary metals preferably constitute less than about 25 weight percent of the tin alloy, more preferably less than about 10 weight percent of the tin alloy, even more preferably less than about 2 weight percent of the tin alloy, and most preferably less than about 1 weight percent of the tin alloy.

In accordance with another embodiment of the present invention, the lead content of the tin alloy is preferably not more than 2.0 weight percent. Preferably, the lead content is less than 0.1 weight percent, more preferably less than 0.05 weight percent, and even more preferably less than 0.01 weight percent. This low lead content is acceptable to avoid environmental or regulatory concerns. The high percentage of tin in the tin alloy is substantially different from prior terne formulations containing 80% lead and 20% tin. The high concentrations of tin in the tin alloy substantially increase the uniformity and strength of the bond between the tin alloy and strip 12 as compared with standard terne alloy coatings. The superior bonding characteristics of the tin alloy makes the tin alloy coating ideal for use with copper strip that is formed and shaped after being coated. Industrial grade tin can be used as the tin source for the tin alloy. Industrial grade tin is known to contain trace amounts of contaminants such as cobalt, nickel, silver and sulphur. It has been found that these elements do not adversely affect the corrosive resistive properties of the tin alloy so long as the weight percentages of these elements is small.

In accordance with another embodiment of the invention, the tin alloy contains bismuth, copper and/or antimony. The bismuth contained in the tin alloy ranges from 0.0 to 1.7 weight percent of the tin alloy and preferably up to about 0.5 weight percent of the tin alloy. Antimony is added to the tin alloy in amounts from 0.0 to 7.5 weight percent of the tin alloly. The tin alloy preferably contains bismuth and/or antimony since these two metals add to abrasion resistant properties of the tin alloy and prevent the tin in the tin alloy from crystallizing, which crystallization can result in flaking of the tin alloy from strip 12. Tin begins to crystallize when the temperature drops below 56° F. (13.2° C.). Only small amounts of antimony or bismuth are needed to stabilize the tin and prevent the tin from crystallizing. Amounts of at least 0.001 to 0.004 weight percent of antimony and/or bismuth have been found to adequately inhibit crystallization of the tin. Antimony also improves the corrosion-resistance of the tin alloy. The addition of bismuth also improves the mechanical properties of the tin alloy such as pliability, hardness and strength of the tin alloy. Copper metal has been found to be an effective coloring agent to reduce the reflectiveness of the newly applied tin alloy by dulling the color of the tin alloy coating. The addition of a small amount of copper to the tin alloy also improves the corrosion-resistance of the tin alloy, especially in marine environments and petroleum environments. The copper addition to the tin alloy also positively affects other physical properties of the metal alloy such as acting as a metallic stabilizer to inhibit crystallization of the tin in the tin alloy, and increasing the pliability of the tin alloy. The copper content can be up to 5 weight percent of the tin alloy. Preferably, the copper content of the tin alloy does not exceed 2.7 weight percent. When copper is added to the tin alloy, the copper content is from 0.001 to 2.7 weight percent, preferably from 0.001 to 1.6 weight percent and more preferably from 0.005 to 0.1 weight percent. Copper is preferably added to the molten metal alloy in the form of brass.

In accordance with another embodiment of the invention, small amounts of other metals, such as zinc, iron, silver, arsenic, manganese, chromium, aluminum, cadmium, nickel, magnesium and/or titanium are added to the tan alloy to strengthen and/or positively affect other physical properties of the tin alloy. These other types of metals preferably constitute very small weight percentages with the tin alloy coating and preferably does not exceed more than 5% of the tin alloy and more preferably is less than 2% of the tin alloy coating and more preferably less than 1% of the tin alloy coating. Zinc, if added to the tin alloy, increases the abrasion resistance of the tin alloy. Zinc metal is added to the tin alloy in weight percentage of 0.0–9.0%. The amount of zinc metal added to the tin alloy will depend on the desired hardness of the tin alloy. Preferably less than 1% zinc is included in the tin alloy, and more preferably the zinc content is less than 0.2 weight percent of the tin alloy. Cadmium has been found to compromise the corrosive resistive properties of the tin alloy. However cadmium has been found to stabilize the tin in the tin alloy. Preferably, the weight percentage of cadmium in the tin alloy is less than 0.05%. The tin alloy which contains nickel exhibits increased corrosion resistance. The nickel additive has been found to increase the corrosion-resistance of the tin coating alloy especially in alcohol and halogen containing environments. The nickel content preferably does not exceed 5.0 weight percent. Larger nickel concentrations make the coated strip difficult to form. Preferably, the nickel content does not exceed 1.0 weight percent, more preferably 0.001–0.9 weight percent and even more preferably about 0.001–0.1 weight percent of the tin alloy. Magnesium, when added to the tin alloy, improves the corrosion resistance of the tin alloy. The addition of magnesium also improves the flowability or viscous qualities of the molten tin alloy to improve the ease of applying the tin alloy and uniformity of the tin alloy coating. The addition of magnesium to the tin alloy further reduces or eliminates the need of using a flux in coating tank 70. The magnesium content preferably does not exceed 5.0 weight percent, more preferably not more than about 1.0 weight percent, and even more preferably 0.001–0.1 weight percent of the tin alloy. Titanium, if added to the tin alloy, positively affects the grain refinement of the tin to improve the bonding of the tin alloy to strip 12. A small grain size of the tin alloy has been found to form a stronger bond to strip 12. Titanium facilitates in the formation of a smaller grain size of the metal alloy. Titanium also reduces the oxidation of the molten tin alloy and reduces dross formation. The titanium content of the tin alloy preferably does not exceed 1.0 weight percent of the metal alloy, more preferably is 0.01–0.5%, and even more preferably 0.001–0.05% of the tin alloy. Aluminum, if added to the tin alloly, reduces oxidation of the molten tin alloy and to reduce dross formation. The aluminum also improves the bonding of the tin alloy to strip 12. Aluminum further increases the luster of the coated tin alloy. In order to dull the color and reflectivity of the tin alloy coating containing aluminum, a coloring and dulling agent such as copper should be added to the tin alloy when aluminum is added to the tin alloy. The amount of aluminum added to the tin alloy preferably does not exceed 5.0 weight percent of the tin alloy, and more preferably, is 0.01–1.0 weight percent, and even more preferably 0.01–0.1 weight percent, and even still more preferably 0.001–0.01 weight percent of the tin alloy. If iron is added to the tin alloy, the iron content preferably does not exceed 19%, more preferably less than 0.19%, and even more preferably, less than 0.02% of the tin alloy. If manganese is added to the tin alloy, the manganese content is preferably 0.0001 to 0.1% of the tin alloy.

The general formulation of the tin alloy is as follows:

| | |
|---|---|
| Tin | 90–99.9 |
| Aluminum | 0–5 |
| Antimony | 0–7.5 |
| Arsenic | 0–0.005 |
| Bismuth | 0–1.7 |
| Cadmium | 0–0.1 |
| Copper | 0–5 |
| Iron | 0–1 |
| Lead | 0–2 |
| Magnesium | 0–5 |
| Nickel | 0–5 |
| Silver | 0–0.005 |

-continued

| | |
|---|---|
| Titanium | 0–1 |
| Zinc | 0–9 |

A more specific formulation of the tin alloy is as follows:

| | |
|---|---|
| Tin | 95–99.9 |
| Aluminum | 0–0.01 |
| Antimony | 0–0.5 |
| Bismuth | 0–0.5 |
| Iron | 0–0.005 |
| Lead | 0–0.1 |
| Nickel | 0–0.1 |
| Zinc | 0–2 |

One very specific formulation of the tin alloy is as follow:

| | |
|---|---|
| Tin | 99–99.99 |
| Antimony | 0–0.4 |
| Bismuth | 0–0.2 |
| Iron | 0–0.001 |
| Lead | 0–0.05 |
| Nickel | 0–0.001 |
| Zinc | 0–0.2 |

A few examples of the metal alloy composition which have exhibited the desired characteristics as mentioned above are set forth as follows:

| Alloy Ingredients | A | B | C | D | E |
|---|---|---|---|---|---|
| Tin | Bal. | Bal. | Bal. | Bal. | Bal. |
| Aluminum | ≦0.01 | ≦0.01 | ≦0.01 | 0.0 | 0.0 |
| Antimony | ≦1.0 | ≦0.1 | ≦0.1 | ≦0.05 | ≦0.05 |
| Bismuth | ≦0.05 | ≦0.05 | ≦0.01 | ≦0.01 | ≦0.01 |
| Copper | ≦0.5 | ≦0.5 | 0.0 | 0.0 | 0.0 |
| Iron | ≦0.1 | ≦0.005 | ≦0.0 | ≦0.0 | ≦0.0 |
| Lead | ≦1.0 | ≦0.1 | ≦0.1 | ≦0.1 | ≦0.05 |
| Nickel | ≦0.005 | ≦0.0 | ≦0.0 | ≦0.0 | ≦0.0 |
| Zinc | ≦1 | ≦1 | ≦1 | ≦1 | ≦1 |

Typically, the formulations of the tin alloy includes: 0.0–9% zinc; 90–99.9% tin; 0.0–0.4% magnesium; 0.0–0.1% manganese; 0.0–1.0% nickel; 0.0–2.0% copper; 0.0–0.15% titanium; 0.0–0.5% aluminum; 0.0–2.0 antimony; 0.0–1.5% bismuth; up to 1.0% iron, 0.0–0.5% silicon, 0.0–0.1% cadmium, 0.0–0.05% boron, 0.0–0.5% carbon, 0.0–0.5% chromium, 0.0–0.1% molybdenum, 0.0–0.1% vanadium, 0.0–0.1% silver, 0.0–0.01% arsenic, 0.0–0.01% sulfur, 0.0–0.01% tellurium and less than 1.0% lead. Preferably, the tin alloy formulation is 0.0–0.1% zinc; 98–99.9% tin; 0.0–0.05% magnesium; 0.0–0.05% manganese; 0.0–0.1% nickel; 0.0–0.1% copper; 0.0–0.01% aluminum; 0.01.0% bismuth and/or antimony; less than 0.05% iron; less than 0.5% lead. More preferably, the tin alloy formulation is 0.0–0.001% zinc; 99–99.9% tin; 0.0–0.001% nickel; 0.0–0.02% copper; 0.0010.8% antimony and/or bismuth; 0.0–0.01iron; and 0.0–0.08% lead.

EXAMPLE A

A copper strip is unwound from a roll of copper strip and is pickled with a hydrochloric acid solution and chemically activated with a zinc chloride solution prior to coating. The copper strip has a thickness of less than 0.03 inch. The strip is not pre-heated prior to coating. The tin alloy includes 90–99% tin and less than 2.0% lead. The tin alloy in the coated tank is at a temperature of 460–475° F. The strip is passed through the coating tank at a speed of about 100 ft/min and has a resident time in the coating tank of less than 10 seconds. The coated strip is passed through coating rollers and/or an air knife to achieve a coating thickness of 0.0003–0.002 inch. The coated strip is then cooled. The coated strip is then oxidized to remove the coated tin alloy to expose and pacify the heat created intermetallic layer. The strip is then wound into a roll.

EXAMPLE B

A copper strip is unwound from a roll of copper strip and is pickled with a hydrochloric acid solution and chemically activated with a zinc chloride solution prior to coating. The copper strip has a thickness of less than 0.03 inch. The copper strip is plated with nickel having a thickness of less than 3 microns. The strip is preheated prior to coating. The tin alloy includes 90–99% tin and less than 2.0% lead. The alloy is heated in a coating tank at a temperature of 460–900° F. The copper strip is passed through the coating tank at a speed of about 100 ft/min and has a resident time in the coating tank of less than 10 seconds. The coated strip is passed through coating rollers and/or an air-knife to achieve a coating thickness of 0.0003–0.002 inch. The coated strip is cooled and then oxidized to remove the tin alloy to expose and pacify the heat created intermetallic layer. The strip is then wound.

EXAMPLE C

A copper strip is unwound from a roll of copper strip. The copper strip has a thickness of less than about 0.03 inch. The strip is not pre-heated prior to coating. The tin alloy includes 99% tin, and less than 0–5% lead. The tin alloy is applied to the strip by an electroplating process. The plated strip is then flow heated for less than 5 minutes. The coated strip is passed through coating rollers and/or an air-knife to achieve a coating thickness of 0.0003–0.002 inch. The coated strip is then cooled. The coated strip is then oxidized to remove the tin alloy to expose and pacify the heat created intermetallic layer. The strip is then wound.

EXAMPLE D

A copper steel strip is unwound from a roll of copper strip and plated with a zinc layer having a thickness of less than 3 microns. The copper strip has a thickness of less than 0.03 inch. The strip is pre-heated prior to coating. The tin alloy includes 90–99% tin and less than 0–1% lead. The strip is passed through a metal spaying process at a speed of up to 100 ft/min. The coated strip is passed through coating rollers and/or an air-knife to achieve a coating thickness of 0.0003–0.002 inch. The coated strip is cooled and then oxidized to remove the tin alloy to expose and pacify the heat created intermetallic layer. The strip is then cut into sheets.

EXAMPLE E

A copper strip is unwound from a roll of copper strip and is pickled with an acid solution and then chemically activated with a chemical activation solution. The copper strip is plated with a metal layer of 1–3 microns thick. The strip is not pre-heated prior to coating. The tin alloy includes 90–99% tin. The tin alloy is plated onto the strip and then flow heated. The strip is then coated again by a spray metal process. The coated strip is then passed through coating rollers and/or an air-knife to achieve a coating thickness of 0.0003–0.002 inch. The coated strip is then cooled and wound into a roll. The roll of coated strip is formed into roofing materials and installed on a building. The formed coated strip is then exposed to an oxidizing solution to remove the tin alloy and expose and pacify the intermetallic layer.

The tin alloy and the intermetallic layer are designed to be used in all types of copper strip applications. The tin alloy and intermetallic layer inherently includes excellent soldering characteristics. When the tin alloy is heated, it has the necessary wetting properties to produce a tight water resistant seal. As a result, the tin alloy acts as both a corrosive resistive coating and a soldering agent for many types of applications. The tin alloy and intermetallic layer can be also welded with standard solders. Typical solders contain about 50% tin and 50% lead. The tin alloy and intermetallic layer have the added advantage of also being able to be soldered with low or no lead solders.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

We claim:

1. A corrosion-resistant material comprising a copper base metal having a heat created corrosion resistant intermetallic surface layer formed by applying a tin alloy to the surface of said base metal and subsequently removing at least a portion of said tin alloy with an oxidizing solution to at least partially expose said heat created intermetallic layer, said intermetallic layer comprising copper from said copper base metal and tin from said tin alloy, at least a portion of said heat created intermetallic layer having a thickness of at least about 0.00004 inch.

2. A material as defined in claim 1, wherein said tin alloy comprises at least about 75 weight percent tin.

3. A material as defined in claim 2, wherein said tin content of said tin alloy is at least about 98 weight percent of said alloy.

4. A material as defined in claim 3, wherein said tin content of said tin alloy is at least about 99 weight percent of said alloy.

5. A material as defined in claim 2, wherein said tin alloy includes a metal additive, said metal additive is selected from the group consisting of at least an effective amount of a stabilizing agent for inhibiting crystallization of the tin, at least an effective amount of a corrosion-resistant agent for enhancing the corrosion-resistant properties of said tin alloy, at least an effective amount of a coloring agent for altering the color of said tin alloy, at least an effective amount of a reflective agent for altering the reflectiveness of said tin alloy, at least an effective amount of a grain agent for altering the grain density of said tin alloy, at least an effective amount of a mechanical agent for altering the mechanical properties of said tin alloy, at least an effective amount of deoxidizing agent for reducing the amount of oxidation of said tin alloy in a molten state, at least an effective amount of bonding agent for enhancing the bonding properties of said tin alloy, and mixtures thereof, said stabilizing agent including a metal selected from the group consisting of antimony, bismuth, cadmium, copper and mixtures thereof, said corrosion-resistant agent including a metal selected from the group consisting of antimony, bismuth, cadmium, chromium, copper, lead, manganese, magnesium, nickel, titanium, and mixtures thereof, said coloring agent including a metal selected from the group consisting of copper, lead, titanium, iron, silver, cadmium and mixtures thereof, said reflective agent including a metal selected from the group consisting of aluminum, chromium, copper, cadmium, silver, titanium and mixtures thereof, said grain agent including a metal selected from the group consisting of manganese, cadmium, titanium and mixtures thereof, said mechanical agent including a metal selected from the group consisting of antimony, aluminum, manganese, bismuth, chromium, copper, iron, nickel, silver, cadmium, arsenic, lead, magnesium, titanium and mixtures thereof, said deoxidizing agent including a metal selected from the group consisting of aluminum, magnesium, manganese, cadmium, titanium and mixtures thereof, said bonding agent including a metal selected from the group consisting of lead, titanium, manganese, cadmium and mixtures thereof.

6. A material as defined in claim 5, wherein said tin alloy comprising:

| Tin | 90–99.9 |
|---|---|
| Zinc | 0–9 |
| Antimony | 0–7.5 |
| Bismuth | 0–1.7 |
| Silver | 0–0.005 |
| Copper | 0–5 |
| Iron | 0–1 |
| Aluminum | 0–5 |
| Arsenic | 0–0.005 |
| Cadmium | 0–0.005 |
| Nickel | 0–5 |
| Lead | 0–2 |
| Magnesium | 0–5 |
| Titanium | 0–1 |

7. A material as defined in claim 6, wherein said alloy comprising:

| Tin | 95–99.9 |
|---|---|
| Zinc | 0–0.2 |
| Antimony | 0–1 |
| Bismuth | 0–0.5 |
| Copper | 0–0.5 |
| Iron | 0–0.1 |
| Aluminum | 0–0.1 |
| Nickel | 0–0.1 |
| Lead | 0–0.5 |

8. A material as defined in claim 7, wherein said tin alloy comprising:

| Tin | 98–99.9 |
|---|---|
| Zinc | 0–0.05 |
| Antimony | 0–0.4 |
| Bismuth | 0–0.2 |
| Copper | 0–0.1 |
| Iron | 0–0.01 |
| Nickel | 0–0.01 |
| Lead | 0–0.05 |

9. A material as defined in claim 1, wherein said tin alloy coating on said copper base metal has a thickness of about 0.0001 to about 0.1 inch.

10. A material as defined in claim 5, wherein said tin alloy coating on said copper base metal has a thickness of about 0.0001 to about 0.1 inch.

11. The material as defined in claim 1, wherein said thickness of said intermetallic layer is about 0.00004–0.0004 inch.

12. The material as defined in claim 10, wherein said thickness of said intermetallic layer is about 0.00004–0.0004 inch.

13. The material as defined in claim 1, wherein said heat created intermetallic layer is at least partially formed from a process of coating said tin alloy on the surface of said copper base metal by a process selected from the group consisting of electroplating and subsequent flow heating, hot dip coating, metal spraying and combinations thereof.

14. The material as defined in claim 12, wherein said heat created intermetallic layer is at least partially formed from a process of coating said tin alloy on the surface of said copper base metal by a process selected from the group consisting of electroplating and subsequent flow heating, hot dip coating, metal spraying and combinations thereof.

15. A material as defined in claim 1, wherein said surface of said intermetallic layer includes a passivated layer at least partially formed from said oxidizing solution, said oxidizing solution includes nitric acid.

16. A material as defined in claim 5, wherein said surface of said intermetallic layer includes a passivated layer at least partially formed from said oxidizing solution, said oxidizing solution includes nitric acid.

17. A material as defined in claim 14, wherein said surface of said intermetallic layer includes a passivated layer at least partially formed from said oxidizing solution, said oxidizing solution includes nitric acid.

18. A material as defined in claim 15, wherein said oxidizing solution contains about 5–60% nitric acid.

19. A material as defined in claim 15, wherein said oxidizing solution includes copper sulfate.

20. A material as defined in claim 16, wherein said oxidizing solution includes copper sulfate.

21. A material as defined in claim 17, wherein said oxidizing solution includes copper sulfate.

22. A material as defined in claim 19, wherein said oxidizing solution includes 0–5–10% copper sulfate.

23. A corrosion-resistant material comprising a copper base metal having a heat created corrosion resistant intermetallic surface layer formed by applying a tin alloy to the surface of said base metal and subsequently removing at least a portion of said tin alloy with a nitric acid containing oxidizing solution to at least partially expose said heat created intermetallic layer, said heat created intermetallic layer is formed by coating said tin alloy on the surface of said copper base metal by a process selected from the group consisting of electroplating and subsequent flow heating, hot dip coating, metal spraying and combinations thereof, said intermetallic layer comprising copper from said copper base metal and tin from said tin alloy, at least a portion of said heat created intermetallic layer having a thickness of at least about 0.00004 inch, said tin alloy including at least about 75 weight percent tin.

24. A material as defined in claim 23, wherein said tin content of said tin alloy is at least about 98 weight percent of said alloy.

25. A material as defined in claim 23, wherein said tin alloy includes a metal additive, said metal additive is selected from the group consisting of at least an effective amount of a stabilizing agent for inhibiting crystallization of the tin, at least an effective amount of a corrosion-resistant agent for enhancing the corrosion-resistant properties of said tin alloy, at least an effective amount of a coloring agent for altering the color of said tin alloy, at least an effective amount of a reflective agent for altering the reflectiveness of said tin alloy, at least an effective amount of a grain agent for altering the grain density of said tin alloy, at least an effective amount of a mechanical agent for altering the mechanical properties of said tin alloy, at least an effective amount of deoxidizing agent for reducing the amount of oxidation of said tin alloy in a molten state, at least an effective amount of bonding agent for enhancing the bonding properties of said tin alloy, and mixtures thereof.

26. A material as defined in claim 23, wherein said tin alloy coating on said copper base metal has a thickness of about 0.0001 to about 0.1 inch.

27. The material as defined in claim 23, wherein said thickness of said intermetallic layer is about 0.00004–0.0004 inch.

28. A material as defined in claim 23, wherein said surface of said intermetallic layer includes a passivated layer at least partially formed from said oxidizing.

* * * * *

UNITED STATES PATENT AND TRADEMARK OFFICE
CERTIFICATE OF CORRECTION

PATENT NO.     : 6,080,497
DATED          : June 27, 2000
INVENTOR(S)    : Carey, II et al.

It is certified that error appears in the above-identified patent and that said Letters Patent is hereby corrected as shown below:

Title page,
Item [63], delete the information at Item [63] and substitute therefor: -- Continuation-in-part of Ser. No. 08/929,623, Sep. 15, 1997, abandoned, which is a continuation-in-part of Ser. No. 08/604,074, Feb. 20, 1996, Pat. No. 5,667,849, which is a divisional of Ser. No. 08/551,456, Nov. 1, 1995, Pat. No. 5,616,424, which is a divisional of Ser. No. 08/402,925, Mar. 13, 1995, Pat. No. 5,491,036, which is a continuation-in-part of Ser. No. 08/380,372, Jan. 30, 1995, Pat. No. 5,480,731, which is a continuation of Ser. No. 08/153,026, Nov. 17, 1993, Pat. No. 5,395,703, which a divisional of Ser. No. 07/858,662, Mar. 27, 1992, Pat. No. 5,314,758.  Also, a continuation-in-part of Ser. No. 08/929,623, Sep. 15, 1997, abandoned, which is a continuation-in-part of Ser. No. 08/604,074 Feb. 20, 1996, Pat. No. 5,667,849, which is a divisional of Ser. No. 08/551,456, Nov. 1, 1995, Pat. No. 5,616,424, which is a divisional of Ser. No. 08/402,925, Mar. 13, 1995, Pat. No. 5,491,036, which is a continuation-in-part of Ser. No. 08/165,085, Dec. 10, 1993, Pat. No. 5,397,652, which is a continuation-in-part of Ser. No. 08/000,101, Jan. 4, 1993, abandoned, which is a continuation-in-part of Ser. No. 07/858,662, Mar. 27, 1992, Pat. No. 5,314,758. Also, a continuation-in-part of Ser. No. 08/929,623, Sep. 15, 1997, abandoned, which is a continuation-in-part of Ser. No. 08/604,074, Feb. 20, 1996, Pat. No. 5,667,849, which is a divisional of Ser. No. 08/551,456, Nov. 1, 1995, Pat. No. 5,616,424, which is a divisional of Ser. No. 08/402,925, Mar. 13, 1995, Pat. No. 5,491,036, which is a continuation-in-part of Ser. No. 08/260,333, Jun. 15, 1994, Pat. No. 5,429,882, which is a continuation-in-part of Ser. No. 08/209,400, Mar.14, 1994, abandoned, which is a continuation-in-part of Ser. No. 08/175,523, Dec. 30, 1993, Patent No. 5,401,586, which is a continuation-in-part of Ser. No. 08/154,376, Nov. 17, 1993, abandoned, which is a continuation of Ser. No. 08/042,649, April 5, 1993, abandoned. Also a continuation-in-part of Ser. No. 08/929,623, Sep. 15, 1997, abandoned, which is a continuation-in-part of Ser. No. 08/604,074, Feb. 20, 1996, Pat. No. 5,667,849, which is a divisional of Ser. No. 08/551,456, Nov. 1, 1995, Pat. No. 5,616,424, which is a divisional of Ser. No. 08/402,925, Mar. 13, 1995, Pat. No. 5,491,036, which is a continuation-in-part of Ser. No. 08/341,365, Nov. 17, 1994, Pat. No. 5,489,490, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/929,623, Sep. 15, 1997, abandoned, which is a continuation-in-part of Ser. No. 08/604,074, Feb. 20, 1996, Pat. No. 5,667,849, which is a divisional of Ser. No. 08/551,456, Nov. 1, 1995, Pat. No. 5,616,424, which is a divisional of Ser. No. 08/402,925, Mar. 13, 1995, Pat. No. 5,491,036, which is a continuation-in-part of Ser. No. 08/347,261, Nov. 30, 1994, Pat. No. 5,491,035, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No.

UNITED STATES PATENT AND TRADEMARK OFFICE
CERTIFICATE OF CORRECTION

| | | |
|---|---|---|
| PATENT NO. | : 6,080,497 | Page 2 of 5 |
| DATED | : June 27, 2000 | |
| INVENTOR(S) | : Carey, II et al. | |

It is certified that error appears in the above-identified patent and that said Letters Patent is hereby corrected as shown below:

08/042,649, Apr. 5, 1993, abandoned. Also, a continuation-in-part of Ser. No. 08/929,623, Sep. 15, 1997, abandoned, which is a continuation-in-part of Ser. No. 08/604,074, Feb. 20, 1996, Pat. No. 5,667,849, which is a divisional of Ser. No. 08/551,456, Nov. 1, 1995, Pat. No. 5,616,424, which is a divisional of Ser. No. 08/402,925, Mar. 13, 1995, Pat. No. 5,491,036, which is a continuation-in-part of Ser. No. 08/165,085, Dec. 10, 1993, Pat. No. 5,401,586, which is a continuation-in-part of Ser. No. 08/000,101, Jan. 4, 1993, abandoned, which is a continuation-in-part of Ser. No. 07/967,407, Oct. 26, 1992, abandoned, which is a continuation-in-part of Ser. No. 07/913,209, Jul. 15, 1992, abandoned, which is a continuation-in-part of Ser. No. 07/858,662, Mar. 27, 1992, Pat. No. 5,314,758. Also, a continuation-in-part of Ser. No. 08/929,623, Sep. 15, 1997, abandoned, which is a continuation-in-part of Ser. No. 08/604,078, Feb. 20, 1996, Pat. No. 5,695,822, which is a divisional of Ser. No. 08/438,042, May 8, 1995, Pat. No. 5,597,656, which is a continuation-in-part of Ser. No. 08/338,386, Nov. 14, 1994, Pat. No. 5,470,667, which is a continuation of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/980,985, Oct. 20, 1997, abandoned, which is a continuation of Ser. No. 08,636,179, Apr. 22, 1996, abandoned, which is a continuation-in-part of Ser. No. 08/551,456, Nov. 1, 1995, Pat. No. 5,616,424, which is a divisional of Ser. No. 08/402,925, Mar. 13, 1995, Pat. No. 5,491,036, which is a continuation-in-part of Ser. No. 08/380,372, Jan. 30, 1995, Pat. No. 5,480,731, which is a continuation of Ser. No. 08/153,026, Nov. 17, 1993, Pat. No. 5,395,703, which is a divisional of Ser. No. 07/858,662, Mar. 27, 1992, Pat. No. 5,314,758. --

Delete column 1, line 5 through column 2, line 59, and substitute therefor:

This patent application is a continuation-in-part of Serial No. 08/929,623, filed September 15, 1997, now abandoned, which in turn is a continuation-in-part of Serial No. 08/604,074 filed February 20, 1996, now Patent No. 5,667,849, which in turn is a divisional of Serial No. 08/551,456 filed November 1, 1995, now Patent No. 5,616,424, which in turn is a divisional of Serial No. 08/402,925 filed March 13, 1995, now Patent No. 5,491,036, which in turn is a continuation-in-part of Serial No. 08/380,372 filed January 30, 1995, now Patent No. 5,480,731, which is in turn a continuation of Serial No. 08/153,026 filed November 17, 1993, now Patent No. 5,395,703, which in turn is a divisional of Serial No. 07/858,662 filed March 27, 1992, now Patent No. 5,314,758.

UNITED STATES PATENT AND TRADEMARK OFFICE
CERTIFICATE OF CORRECTION

PATENT NO. : 6,080,497
DATED : June 27, 2000
INVENTOR(S) : Carey, II et al.

It is certified that error appears in the above-identified patent and that said Letters Patent is hereby corrected as shown below:

This patent application is also a continuation-in-part of Serial No. 08/929,623 filed September 15, 1997, now abandoned, which in turn is a continuation-in-part of Serial No. 08/604,074 filed February 20, 1996, now Patent No. 5,667,849, which in turn is a divisional of Serial No. 08/551,456 filed November 1, 1995, now Patent No. 5,616,424, which in turn is a divisional of Serial No. 08/402,925, filed March 13, 1995, now Patent No. 5,491,036, which in turn is a continuation-in-part of Serial No. 08/165,085 filed December 10, 1993, now Patent No. 5,397,652, which in turn is a continuation-in-part of Serial No. 08/000,101 filed January 4, 1993, now abandonded, which in turn is a continuation-in-part of Serial No. 07/858,662 filed March 27, 1992, now Patent No. 5,314,758.

This patent application is further a continuation-in-part of Serial No. 08/929,623 filed September 15, 1997, now abandoned, which in turn is a continuation-in-part of Serial No. 08/604,074 filed February 20, 1996, now Patent No. 5,667,849, which in turn is a divisional of Serial No. 08/551,456 filed November 1, 1995, now Patent No. 5,616,424, which in turn is a divisional of Serial No. 08/402,925 filed March 13, 1995, now Patent No. 5,491,036, which in turn is a continuation-in-part of Serial No. 08/260,333 filed June 15, 1994, now Patent No. 5,429,882, which in turn is a continuation-in-part of Serial No. 08/209,400 filed March 14, 1994, now abandoned, which in turn is a continuation-in-part of Serial No. 08/175,523 filed December 30, 1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

This patent application is still further a continuation-in-part of Serial No. 08/929,623 filed September 15, 1997, now abandoned, which in turn is a continuation-in-part of Serial No. 08/604,074 filed February 20,1996, now Patent No. 5,667,849, which in turn is a divisional of Serial No. 08/551,456 filed November 1, 1995, now Patent No. 5,616,424, which in turn is a divisional of Serial No. 08/402,925 filed March 13, 1995, now Patent No. 5,491,036, which in turn is a continuation-in-part of Serial No. 08/341,365 filed November 17, 1994, now Patent No. 5,489,490, which in turn is a continuation-in-part of Serial No. 08/175,523 filed December 30, 1993, now Patent No. 5,401,586, which in turn is a continuation-in-part of Serial No. 08/154,376 filed November 17, 1993, now abandoned,which in turn is a continuation of Serial No. 08/042,649 filed April 5, 1993, now abandoned.

UNITED STATES PATENT AND TRADEMARK OFFICE
CERTIFICATE OF CORRECTION

PATENT NO. : 6,080,497
DATED : June 27, 2000
INVENTOR(S) : Carey, II et al.

It is certified that error appears in the above-identified patent and that said Letters Patent is hereby corrected as shown below:

This patent application is also a continuation-in-part of Serial No. 08/929,623 filed September 15, 1997, now abandoned, which in turn is a continuation-in-part of Serial No. 08/604,074, filed February 20, 1996, now Patent No. 5,667,849, which in turn is a divisional of Serial No. 08/551,456 filed November 1, 1995, now Patent No. 5,616,424, which in turn is a divisional of Serial No. 08/402,925 filed March 13, 1995, now Patent No. 5,491,036, which in turn is a continuation-in-part of Serial No. 08/347,261 filed November 30, 1994, now Patent No. 5,491,035, which in turn is a continuation-in-part of Serial No. 08/175,523 filed December 30, 1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

This patent application is further a continuation-in-part of Serial No. 08/929,623 filed September 15, 1997, now abandoned, which in turn is a continuation-in-part of Serial No. 08/604,074 filed February 20, 1996, now Patent No. 5,667,849, which in turn is a divisional of Serial No. 08/551,456 filed November 1, 1995, now Patent No. 5,616,424, which in turn is a divisional of Serial No. 08/402,925 filed March 13, 1995, now Patent No. 5,491,036, which in turn is a continuation-in-part of Serial No. 08/165,085 filed December 10, 1993, now Patent No. 5,401,586, which in turn is a continuation-in-part of Serial No. 08/000,101 filed January 4, 1993, now abandoned, which in turn is a continuation-in-part of Serial No. 07/967,407 filed October 26, 1992, now abandoned, which in turn is a continuation-in-part of Serial No. 07/913,209 filed July 15, 1992, now abandoned, which in turn is a continuation-in-part of Serial No. 07/858,662 filed March 27, 1992, now Patent No. 5,314,758.

This patent application is still further a continuation-in-part of Serial No. 08/929,623 filed September 15, 1997, now abandoned, which in turn is a continuation-in-part of Serial No. 08/604,078 filed February 20, 1996, now Patent No. 5,695,822, which in turn is a divisional of Serial No. 08/438,042 filed May 8, 1995, now Patent No. 5,597,656, which in turn is a continuation-in-part of Serial No. 08/338,386 filed November 14, 1994, now Patent No. 5,470,667, which in turn is a continuation of Serial No. 08/175,523 filed December 30, 1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

UNITED STATES PATENT AND TRADEMARK OFFICE
CERTIFICATE OF CORRECTION

PATENT NO.    : 6,080,497
DATED         : June 27, 2000
INVENTOR(S)   : Carey, II et al.

It is certified that error appears in the above-identified patent and that said Letters Patent is hereby corrected as shown below:

This patent application is yet further a continuation-in-part of Serial No. 08/980,985 filed October 20, 1997, now abandoned, which in turn is a continuation of Serial No. 08/636,179 filed April 22, 1996, now abandoned, which in turn is a continuation-in-part of Serial No. 08/551,456 filed November 1, 1995, now Patent No. 5,616,424, which in turn is a divisional of Serial No. 08/402,925 filed March 13, 1995, now Patent No. 5,491,036, which in turn is a continuation-in-part of Serial No. 08/380,372 filed January 30, 1995, now Patent No. 5,480,731, which is in turn a continuation of Serial No. 08/153,026 filed November 17, 1993, now Patent No. 5,395,703, which in turn is a divisional of Serial No. 07/858,662 filed March 27, 1992, now Patent No. 5,314,758.

Signed and Sealed this

Thirtieth Day of July, 2002

*Attest:*

JAMES E. ROGAN
*Attesting Officer*   *Director of the United States Patent and Trademark Office*

Disclaimer 6,080,497—Jay F. Carey, II, Follansbee, W. Va.; Mehrooz Zamanzadeh, Pittsbugh, Pa.; Nicholas R. Hesske, Weirton, W. Va. CORROSION-RESISTANT COATED COPPER METAL AND METHOD FOR MAKING THE SAME. Patent dated June 27, 2000. Disclaimer filed June 3, 2002, by the assignee, The Louis Berkman Company.

The term of this patent shall not extend beyond the expiration date of Pat. No. 5,667,849.
*(Official Gazette, June 10, 2003)*